US011235937B2

(12) United States Patent
Mushynski et al.

(10) Patent No.: US 11,235,937 B2
(45) Date of Patent: Feb. 1, 2022

(54) PEDESTRIAN-VEHICLE SAFETY SYSTEMS FOR LOADING DOCKS

(71) Applicant: Rite-Hite Holding Corporation, Milwaukee, WI (US)

(72) Inventors: Alan Mushynski, Madison, AL (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 16/518,465

(22) Filed: Jul. 22, 2019

(65) Prior Publication Data
US 2020/0024090 A1      Jan. 23, 2020

Related U.S. Application Data

(60) Provisional application No. 62/763,124, filed on Jul. 23, 2018.

(51) Int. Cl.
| | |
|---|---|
| *B65G 69/28* | (2006.01) |
| *G08B 21/02* | (2006.01) |
| *G08B 21/22* | (2006.01) |
| *G08G 1/005* | (2006.01) |

(52) U.S. Cl.
CPC ......... *B65G 69/2882* (2013.01); *G08B 21/02* (2013.01); *G08B 21/22* (2013.01); *G08G 1/005* (2013.01); *B65G 2203/042* (2013.01)

(58) Field of Classification Search
CPC ..... H04L 67/12; H04L 41/069; G06F 3/0482; G06F 3/04845; B65G 69/2882; B65G 2203/042; G08B 21/02; G08B 21/22; G08G 1/005
See application file for complete search history.

(56) References Cited

U.S. PATENT DOCUMENTS

| | | | | |
|---|---|---|---|---|
| 9,771,225 | B2* | 9/2017 | Stone | B65G 69/2811 |
| 9,896,282 | B2* | 2/2018 | Boston | B65G 69/005 |
| 10,032,380 | B2* | 7/2018 | Mushynski | G08G 1/166 |
| 10,150,414 | B2* | 12/2018 | Myers | B60R 1/00 |

(Continued)

OTHER PUBLICATIONS

International Search Authority, "International Search Report," issued in connection with International Patent Application No. PCT/US2019/042765, dated Oct. 11, 2019, 5 pages.

(Continued)

*Primary Examiner* — Joseph H Feild
*Assistant Examiner* — Rufus C Point
(74) *Attorney, Agent, or Firm* — Hanley, Flight & Zimmerman, LLC

(57) ABSTRACT

Pedestrian-Vehicle safety systems for loading docks are disclosed. An example system includes a first sensor system to determine a position of a vehicle relative to a pedestrian zone adjacent a dock wall of a loading dock and a second sensor system to monitor the pedestrian zone. The second sensor system to attempt to detect a pedestrian in the pedestrian zone, the second sensor system responsive to signals from the first sensor system to enable the second sensor system to dynamically change a sensing area of the pedestrian zone to maintain a delta threshold between the vehicle and the pedestrian zone in response to the vehicle moving toward a dock wall of the loading dock.

26 Claims, 12 Drawing Sheets

(56) References Cited

U.S. PATENT DOCUMENTS

| | | | |
|---|---|---|---|
| 10,227,190 B2* | 3/2019 | Brooks | B65G 69/00 |
| 2006/0137261 A1* | 6/2006 | Maly | B65G 69/2882 52/36.3 |
| 2008/0010757 A1* | 1/2008 | Hochstein | B65G 69/2811 14/69.5 |
| 2012/0025964 A1* | 2/2012 | Beggs | B60Q 1/26 340/435 |
| 2015/0375947 A1* | 12/2015 | Hochstein | G01V 8/20 348/143 |
| 2017/0101278 A1* | 4/2017 | Stone | G08B 21/02 |
| 2018/0096603 A1* | 4/2018 | Mushynski | G08G 1/166 |

OTHER PUBLICATIONS

International Search Authority, "Written Opinion" issued in connection with International Patent Application No. PCT/US2019/042765, dated Oct. 11, 2019, 8 pages.

European Patent Office, "Communication pursuant to Rules 161(1) and 162 EPC," issued in connection with European Patent Application No. 19752599.1, dated Mar. 2, 2021, 3 pages.

International Bureau, "International Preliminary Report on Patentability," issued in connection with International Patent Application No. PCT/US2019/042765, dated Feb. 4, 2021, 8 pages.

* cited by examiner

US 11,235,937 B2

PEDESTRIAN-VEHICLE SAFETY SYSTEMS FOR LOADING DOCKS

CROSS-REFERENCE TO RELATED APPLICATION

This patent claims the benefit under 35 U.S.C. § 119(e) of U.S. Provisional Patent Application Ser. No. 62/763,124 entitled, "Pedestrian-Vehicle Safety Systems for Loading Docks," which was filed on Jul. 23, 2018, and is hereby incorporated by reference in its entirety.

FIELD OF THE DISCLOSURE

The present disclosure relates generally to loading dock safety systems and, more specifically, to pedestrian-vehicle safety systems for loading docks.

BACKGROUND

Typical loading docks provide an area for a truck to back up into for transferring cargo between the truck and the building. Some loading docks include equipment such as dock levelers and/or vehicle restraints. Dock levelers provide an adjustable platform and/or ramp between the dock and the truck bed. Vehicle restraints help prevent a truck from prematurely driving away from the platform during loading/unloading operations.

DETAILED DESCRIPTION

Figure 1:
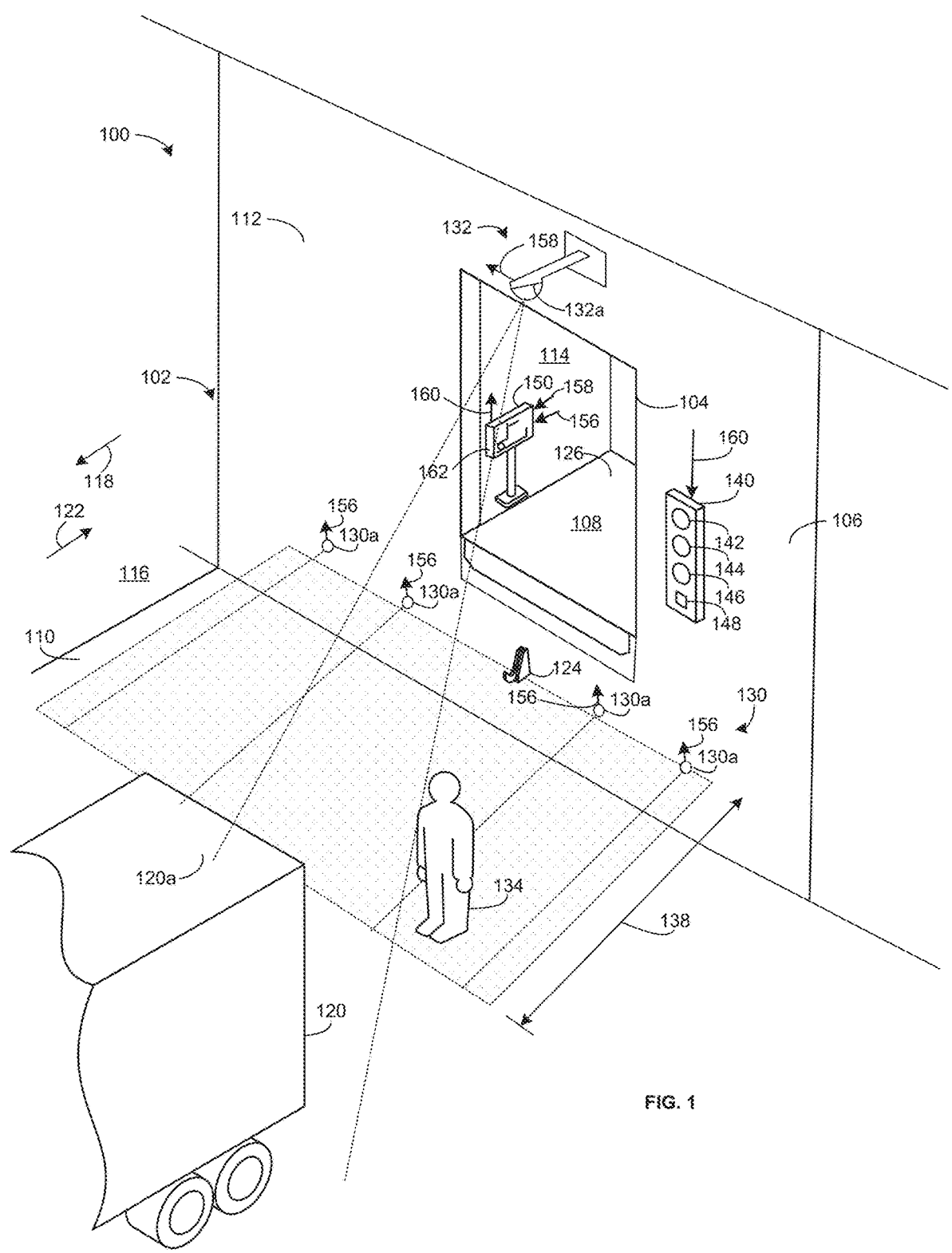
FIG. 1 is a perspective view of an example loading dock implemented with an example safety system constructed in accordance with the teachings disclosed herein.

Example safety systems and related methods for use at loading docks are disclosed. Some example safety systems disclosed herein employ sensors, sensing systems, electronic systems, signal devices, and/or control systems to prevent or reduce a likelihood of a collision between a vehicle and a person at a loading dock. In some examples, the sensors disclosed herein detect whether a vehicle is approaching a dock, leaving the dock, and/or is parked at the dock. In some examples disclosed herein, warning signals provide variable outputs reflecting a magnitude or urgency of certain potential conditions (e.g., reflecting the level of danger, threat and/or likelihood of an accident, etc.). Some example methods and systems disclosed herein provide non-emergency alert signals that notify personnel that a vehicle is present at the dock but is either stopped or restrained relative to the dock area. Some example methods and systems disclosed herein provide a graphical indoor display that presents outdoor operating conditions.

Example safety systems disclosed herein significantly improve the sensing accuracy associated with a loading dock. For instance, example safety systems disclosed herein reduce (e.g., prevent) instances of activation of alarms or other warning outputs due to vehicle presence when pedestrians are not present, as compared to prior systems. In some example safety systems disclosed herein, a pedestrian zone adjacent a loading dock is monitored (e.g., via a pedestrian sensor) to detect a presence of a pedestrian within the pedestrian zone. In some such example safety systems disclosed herein, a vehicle detector detects a presence of a vehicle at a loading dock and a pedestrian detector detects a presence of a pedestrian in the pedestrian zone associated with the loading dock. Specifically, example pedestrian detectors disclosed herein monitor or establish the pedestrian zone adjacent the dock face of the loading dock.

Example pedestrian detectors disclosed herein are responsive to signals or outputs of example vehicle detectors. Specifically, example pedestrian detectors disclosed herein modify or adjust (e.g., increase or decrease) a sensing area and/or sensing distance of a pedestrian zone adjacent a dock face in response to signals or outputs from an example vehicle detector. For example, an example pedestrian detector of an example safety system disclosed herein dynamically modifies a sensing area of a pedestrian zone relative to a dock face based on a position or distance of a vehicle relative to the dock face. For example, the example pedestrian detector modifies or adjusts (e.g., collapses) the sensing area or sensing distance of the pedestrian zone to maintain a delta threshold (e.g., a gap) between the vehicle and the pedestrian zone in response to the vehicle moving toward the dock face. For example, the monitoring and alert system of the illustrated example dynamically adjusts the sensing distance of the pedestrian zone to maintain a gap between the vehicle and the leading edge of the pedestrian to a differential distance equal to or greater than a threshold distance. In some examples, the pedestrian monitor maintains the differential distance (e.g., a gap) between the vehicle and the pedestrian zone equal to or greater than a distance threshold (e.g., between 1 inch and 12 inches). In this manner, as the vehicle moves in a direction toward the dock face of the loading dock, the pedestrian monitor reduces a size or area of the pedestrian zone used for monitoring a presence of a pedestrian. Unlike prior systems that disable monitoring for a presence of a pedestrian in a pedestrian zone when a vehicle approaches or enters the pedestrian zone, example pedestrian monitors disclosed herein monitor for a presence of a pedestrian until the vehicle is parked adjacent the dock face (e.g., the vehicle is restrained for loading/unloading operation). As a result, example safety systems disclosed herein prevent activation of an alarm that may otherwise initiate when a vehicle enters the pedestrian zone as the vehicle moves toward the dock face, thereby significantly improve the sensing accuracy associated with a loading dock.

FIG. 1 is a perspective view of an example loading dock 100 equipped with the monitoring and alert system 102 implemented in accordance with the teachings of this disclosure. The loading dock 100 of the illustrated example has a doorway 104 for entering and/or leaving a building 106, an elevated platform 108, and a driveway 110 providing a pathway to the doorway 104. In some examples, the loading dock 100 can include a weather barrier (e.g., a dock seal or a dock shelter). The doorway 104 is provided in a building wall that defines a dock face 112 (e.g., a dock wall) of the loading dock 100. The loading dock 100 of the illustrated example includes an indoor area 114 and an outdoor area 116. The dock face 112 of the illustrated example generally faces in a forward direction 118 toward the outdoor area 116.

As a vehicle 120 backs up toward the dock face 112, the vehicle 120 travels or moves in a rearward direction 122 towards the dock face 112 along the driveway 110. The loading dock 100 of the illustrated example includes a vehicle restraint 124 and a dock leveler 126. To facilitate transferring cargo between the vehicle 120 and the indoor area 114, the dock leveler 126 provides an adjustable bridge (e.g., a platform or ramp) dimensioned to span a gap that might exist between the dock face 112 and a rear edge 120a of the vehicle 120. To help prevent the vehicle 120 from prematurely pulling away from the dock face 112 during loading and/or unloading operations, the vehicle restraint 124 may selectively engage a vehicle's rear impact guard (RIG or ICC bar), a tire, and/or some other portion of the vehicle 120. Example vehicles 120 include, but are not limited to, a truck, a trailer, an open trailer bed, an enclosed trailer bed, and/or a lorry.

To detect a hazardous condition when the vehicle 120 moves rearward 122 toward the loading dock 100, the monitoring and alert system 102 of the illustrated example includes a pedestrian scanner system 130 (e.g., a pedestrian sensor) and a vehicle sensor system 132. In the illustrated example, the pedestrian scanner system 130 includes a plurality of pedestrian sensors 130a. However, in some examples, the pedestrian scanner system 130 can include one pedestrian sensor, two pedestrian sensors, three pedestrian sensors and/or any number of pedestrian sensors. In some examples, the pedestrian scanner system 130 may effectively merge the pedestrian sensors 130a into a single sensor to monitor the area of the pedestrian zone 136. Likewise, the vehicle sensor system 132 of the illustrated example includes a vehicle sensor 132a. However, in some examples, the vehicle sensor system 132 may include two vehicle sensors, three vehicle sensors, or any number of vehicle sensors.

The pedestrian scanner system 130 of the illustrated example attempts to detect a presence of a person 134, and the vehicle sensor system 132 of the illustrated example attempts to detect the presence of the vehicle 120 at the loading dock 100. To detect the presence of a pedestrian (e.g., the person 134) adjacent the dock face 112, the pedestrian scanner system 130 of the illustrated example provides or generates a pedestrian zone 136 (e.g., a sensing zone). As described in greater detail below, the monitoring and alert system 102 of the illustrated example dynamically varies or adjusts (e.g., expands or collapses) an area of the pedestrian zone 136. To vary the area of the pedestrian zone 136, the monitoring and alert system 102 of the illustrated example adjusts (e.g., increases or decreases) a sensing distance 138 of the pedestrian zone 136 based on a position of the vehicle 120 relative to the dock face 112 provided by the vehicle sensor system 132 as the vehicle 120 moves (e.g., in the rearward direction 122) toward the loading dock 100. To this end, the monitoring and alert system 102 of the illustrated example prevents or reduces a likelihood of a collision between the vehicle 120 and the person 134 at the loading dock 100 and/or reduces inadvertent alarm activation that may otherwise be caused by the vehicle 120 entering the pedestrian zone 136 when a person (e.g., the person 134) is not present in the pedestrian zone 136. Although the pedestrian zone 136 is shown by lines in FIG. 1, it will be understood that the lines may not be visible in the environment but instead represent an area covered by the pedestrian scanner system 130 (e.g., the pedestrian sensors 130a).

The term, "pedestrian zone" refers to an area and/or a distance range within which a sensor monitors a person 134 positioned within an area (e.g., a defined area) that can be detected by (e.g., cause a signal to be generated by) a corresponding sensor. The term, "person" or "pedestrian" may be used interchangeably and refer to any human individual such as a dock worker or a pedestrian, a forktruck driver, or other vehicle operator.

The term, "pedestrian sensor" and "vehicle sensor" refers to any device that can detect the presence and/or movement of a vehicle and/or a person/object. Some example sensors detect or sense the presence of a vehicle and/or a person regardless of whether the vehicle and/or the person are moving. Some example sensors detect or sense movement of a vehicle and/or a person. Some example sensors detect or sense movement of a vehicle and/or a person toward and/or away from the dock face 112. In some examples, the example sensors detect a position (e.g., a distance) of the vehicle 120 relative to the dock face 112 and/or the pedestrian zone 136. In some examples, the example sensors can vary the sensing distance 138 of the pedestrian zone 136 relative to the dock face 112. In some examples, the sensors detect a presence of a person in the pedestrian zone 136 without detecting a distance of the detected person relative to the dock face 112. In some examples, the sensors detect the presence location of the vehicle relative to the pedestrian zone 136 and/or dock face 112 without measuring a distance of the vehicle 120 relative to the dock face 112.

To provide an alarm or convey information regarding a condition at the loading dock 100, the monitoring and alert system 102 of the illustrated example includes an outdoor signal device 140. The monitoring and alert system 102 of the illustrated example causes the outdoor signal device 140 to emit one or more output signals in response to detection of the vehicle 120 and/or the person 134 (e.g., a possibly hazardous condition) at the loading dock 100. The outdoor signal device 140 of the illustrated example includes a first output signal 142 (e.g., a green light), a second output signal 144 (e.g., a yellow light), a third output signal 146 (e.g., a red light) and/or a fourth output signal 148 (e.g., an audible alarm).

The term "signal device" refers to any device for communicating information or emitting one or more outputs (e.g., warning signals, light, audible, vibration, tactile and/or visual indicator, etc.) to a person, a driver of a vehicle, and/or any other person and/or other system(s) associated with the loading dock. Typically, an output from a signal device is perceivable by human senses. As examples, the outputs 142-146 emitted from the outdoor signal device 140 may be warning indicative of a potentially hazardous condition being detected at the loading dock 100, and the fourth output 148 emitted from the outdoor signal device 140 may be a non-warning signals indicated of no potentially hazardous condition being detected at the loading dock 100. For example, warning signals may be provided by yellow lights, red lights, tactile alerts, audible alerts and/or any combination thereof or a non-warning signal may be provided by a green light when not emitting a warning signal (e.g., a red light, a yellow light, an audible alarm, etc.).

Examples of a signal device disclosed herein include, but are not limited to, a light, a horn, a buzzer, a vibrator, a cellular phone, a mobile device, an alarm, a graphical display, a stop-and-go light, a digital display screen, a siren, and/or any combination(s) thereof. Some example signal devices are portable (e.g., carried by the person 134 and/or a driver of the vehicle 120). In some examples, a cellular phone or mobile device carried within the vehicle 120 and/or by the driver of the vehicle 120 implement such a signal device. Some example signal devices emit various lights that are distinguishable by color, intensity, movement, and/or pattern (e.g., flashing and/or continuous lights). Some example signal devices emit sound(s) which may be distinguishable by volume, pitch, tone, and/or pattern (e.g., intermittent and/or continuous sounds). Some signal devices are haptic devices that vibrate or otherwise move in a manner to be felt by a person wearing or carrying the device. However, in some examples, the outputs signals 142-148 may be additionally or alternatively received by an electronic device such as a robot, a drone, an unmanned vehicle such as a truck driven by a computer, etc. In some examples, a signal or alert can be provided to a mobile device carried by a person and/or a driver of a vehicle. In some such examples, the signal to the mobile device can be provided via Bluetooth, WIFI and/or any other wireless communication(s).

To control the pedestrian scanner system 130, the vehicle sensor system 132, and/or an output of the outdoor signal device 140, the monitoring and alert system 102 of the illustrated example includes an electronic controller 150. The electronic controller 150 of the illustrated example is in communication with the pedestrian scanner system 130, the vehicle sensor system 132, and the outdoor signal device 140. For example, the pedestrian scanner system 130 provides feedback signals 156 and the vehicle sensor system 132 provides feedback signals 158 that are conveyed or received as inputs by the electronic controller 150. Based on the feedback signals 156, 158, the electronic controller 150 of the illustrated example provides a control signal 160 to control the outdoor signal device 140. Additionally, as described in greater detail in connection with FIGS. 2-4, the electronic controller 150 of the illustrated example modifies and/or adjust the sensing distance 138 of the pedestrian zone 136 based on the feedback signals 156 and 158 received from the respective pedestrian scanner system 130 and the vehicle sensor system 132.

The electronic controller 150 of the illustrated example is in communication with the pedestrian scanner system 130, the vehicle sensor system 132, the outdoor signal device 140 via a network, and the vehicle restraint 124 (e.g., a process control network). The example network may be implemented using any suitable wired and/or wireless network(s) including, for example, one or more data buses, one or more process control networks, one or more Local Area Networks (LANs), one or more wireless LANs, one or more cellular networks, one or more fiber optic networks, one or more private networks, one or more public networks, etc. The network 164 enables the example pedestrian scanner system 130, the vehicle sensor system 132 and the outdoor signal device 140 to be in communication with the electronic controller 150. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The term "controller" refers to any circuitry (e.g., wiring, relays, integrated circuit (IC), computer, programmable logic controller, logic circuit, logic gate, processor, microprocessor, etc.). A controller can be used to determine the operation of a signal device (e.g., by causing the output device to provide an output signal) in response to receiving input from one or more sensors (e.g., the pedestrian scanner system 130 and/or the vehicle sensor system 132). The electronic controller 150 of the illustrated example is housed within an enclosure 162. However, in some examples, the electronic controller 150 is positioned at another location such as a remote location (e.g., in the cloud) communicatively coupled to the components (e.g., the pedestrian scanner system 130, the vehicle sensor system 132, the outdoor signal device 140, the vehicle restraint 124, etc.) of the monitoring and alert system 102. In some examples various parts of the electronic controller 150 are distributed over multiple locations. Example locations of the controller include, but are not limited to, housed within a separate enclosure, housed within an enclosure that contains the outdoor signal device 140, housed within a sensor enclosure of the pedestrian scanner system 130 and/or the vehicle sensor system 132, positioned at a remote location such as a control room of a warehouse, and/or various combinations thereof. To provide a compact, robust installation, some examples of the enclosure contain both the outdoor signal device 140 and at least one of the pedestrian scanner system 130 and/or the vehicle sensor system 132.

Figure 2:
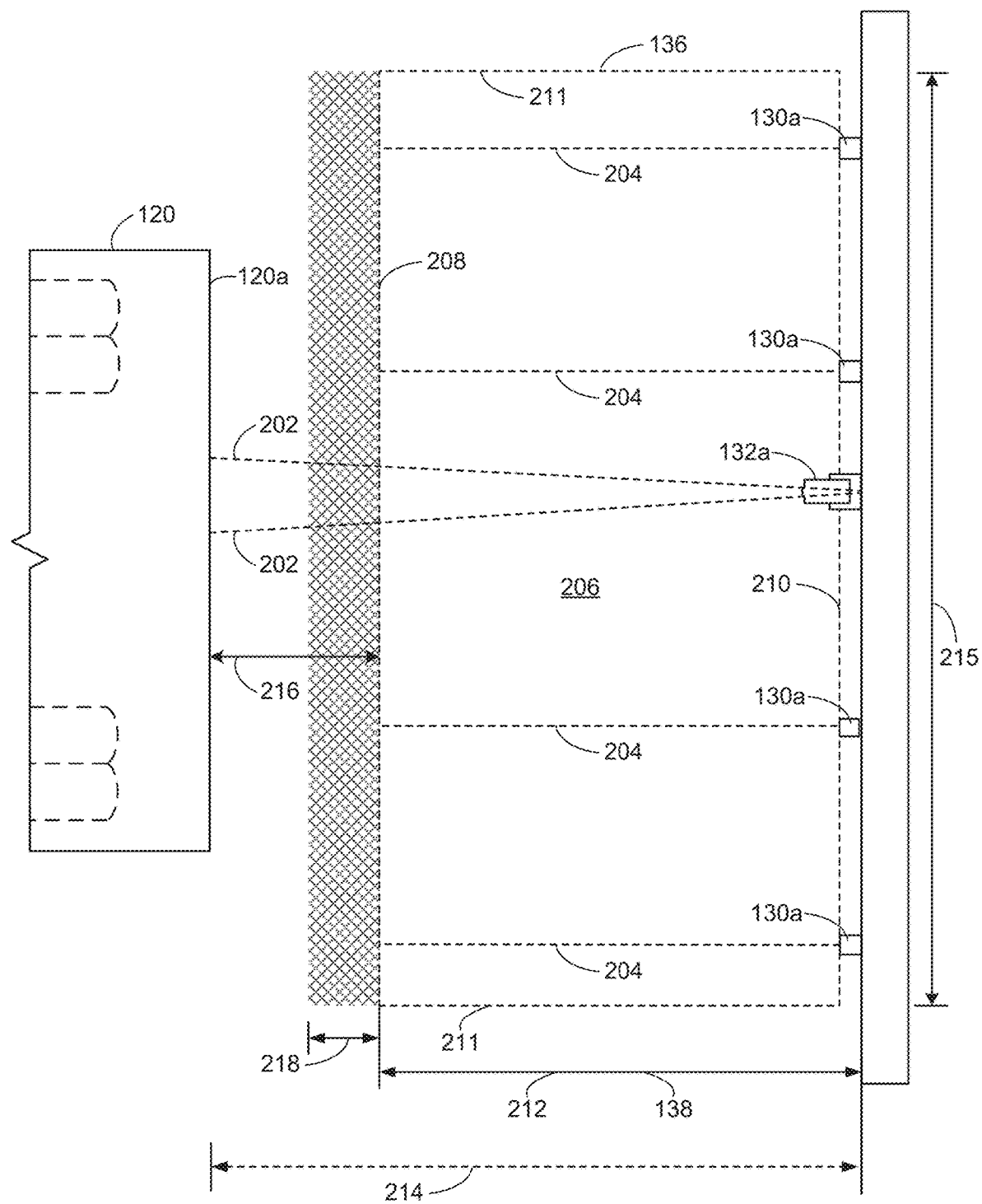
FIG. 2 is a plan view of the example loading dock of FIG. 1 showing an example pedestrian zone of the example safety system at a first sensing distance.

FIG. 2 is a top view of the example loading dock 100 of FIG. 1. To detect a presence of the vehicle 120 at the loading dock 100 and/or approaching the dock face 112, the vehicle sensor 132a of the illustrated example provides one or more sensing projections or a sensing field 202 (e.g., a light beam) that extends beyond the sensing field 204 of the pedestrian zone 136 (e.g., a distance away from the dock face 112 that is greater than a distance at which the pedestrian zone 136 projects from the dock face 112). In some examples, the vehicle sensor system 132 monitors an area that is in front of the pedestrian zone 136 (e.g., that is approximately between 25 feet and 35 feet from the dock face 112). In the illustrated example, the vehicle sensor system 132 is located (e.g., centrally located) above the doorway 104 (e.g., above a shelter or header of the loading dock 100). In some examples, the vehicle sensor 132a may be located on the vehicle restraint 124 and/or any other location of the loading dock 100, loading dock equipment, and/or the building 106. In some examples, the vehicle sensor system 132 of the illustrated example detects a distance (e.g., the first distance 212) of the vehicle 120 relative to the dock face 112, a speed of the vehicle 120 and/or a direction (e.g., the forward direction 118 or the rearward direction 122) of movement of the vehicle relative to the dock face 112.

To establish the pedestrian zone 136, the pedestrian sensors 130a emit sensing field 204 (e.g., light beams, sensing projections, etc.) that extends a distance away from the dock face 112 to monitor the pedestrian zone 136. The sensing field 204 of the illustrated example defines a perimeter or area of the pedestrian zone 136. In the illustrated example, the sensing field 204 is a horizontal field that detects a presence of an object within a perimeter of the horizontal field. The pedestrian zone 136 of the illustrated example includes a forward or leading edge 208, a rear edge or end line 210 and side or lateral edges 211. The end line 210 of the pedestrian zone 136 of the illustrated example is immediately adjacent (e.g., juxtaposed relative to) the dock face 112. For example, the end line 210 of the illustrated example is at a distance from the dock face 112 that is less than the distance of the leading edge 208. The sensing field 204 of the illustrated example monitors up to a first distance 212 between the dock face 112 and the leading edge 208 of the pedestrian zone 136 to define the sensing distance 138 of the pedestrian zone 136. Thus, the sensing distance 138 of the pedestrian zone 136 of the illustrated example is measured between the dock face 112 and the leading edge 208 of the pedestrian zone 136. A width 215 of the pedestrian zone 136 defined between the lateral sides 211 may be similar or equal to a width of the loading dock 100 and/or at least a width of the doorway 104.

The pedestrian zone 136 of the illustrated example can be modified to extend to different lengths (e.g., different sensing distances 138) from the dock face 112. In some examples, the pedestrian zone 136 is configured to sense objects present at the loading dock 100 at different sensing distances 138 from the dock face 112, where each of the different sensing distances 138 covers a different area or distance extending from the dock face 112. For example, the pedestrian zone 136 of the illustrated example can provide a first area when the sensing distance 138 (e.g., the leading edge 208) is at a first distance of approximately 12 ft. from the dock face 112, a second area when the sensing distance 138 is at a second distance of approximately 9 ft. from the dock face 112, a third area when the sensing distance 138 is at a third distance of approximately 6 ft. from the dock face 112, etc. In the illustrated example, the pedestrian zone 136 projects the first distance 212 (e.g., between 8 feet and 12 feet) from the dock face 112. The first distance 212 of the illustrate example is defined between the leading edge 208 of the pedestrian zone 136 and the dock face 112. In some examples, the first distance 212 of the illustrated example is a fully extended sensing distance (e.g., a maximum distance) of the sensing field 204 provided by the pedestrian sensors 130a capable of detecting the presence of a pedestrian in the pedestrian zone 136. In other words, in some such examples, the first distance 212 is a maximum distance from the dock face 112 that the pedestrian zone 136 projects. The first distance 212 representing a fully extended sensing distance may be a predetermined distance determined during installation and/or configuration of the monitoring and alert system 102.

The pedestrian sensors and the vehicle sensor are not limited to the example vehicle sensors 132a and/or the pedestrian sensors 130a of FIGS. 1 and 2. Example sensors that may be used to sense or detect presence and/or movement include, but are not limited to, active infrared, passive infrared, ultrasonic, radar, microwave, laser, electromagnetic induction, pressure pad, ultra-IR LED, time-of-flight pulse ranging technology, photoelectric eye, thermal, video analytics, and/or any combination(s) thereof. Some example sensors that may be used to implement the systems disclosed herein include, but are not limited to, a model BEA LZR, a model BEA Sparrow, a model BEA Falcon, a model LZR-i100, a model BEA LZR-i30, a model UC4000 Ultrasonic Sensor, and a model R2100 Multi-Beam LED Scanner. The BEA LZR examples are products of BEA Industrial of Belgium, and the R2100 and the UC400 examples are products of Pepperl & Fuchs of Germany. In some examples, the vehicle sensor system 132 is a single BEA Falcon microwave motion sensor having a sensing projection extending beyond the pedestrian zone 136. In some examples, the pedestrian scanner system 130 is a multiple LZR-i100 presence sensor. In some examples, sensors of the pedestrian scanner system 130 and/or the vehicle sensor system 132 of the example monitoring and alert system 102 disclosed herein may include one or more sensors that represent an image, a video and/or any other suitable signal(s). For example, any sensor (e.g., a camera) capable of determining the presence of a vehicle relative to the loading dock and/or a pedestrian in the pedestrian zone can be utilized.

The monitoring and alert system 102 of the illustrated example dynamically adjusts the sensing area (e.g., the sensing distance 138) of the pedestrian zone 136 based on a position (e.g., a distance 214 or position) of the vehicle 120 relative to the pedestrian zone 136 and/or the dock face 112. For example, the electronic controller 150 of the illustrated example dynamically adjusts (e.g., collapses or expands) the sensing distance 138 of the pedestrian zone 136 relative to the dock face 112 to maintain a gap or delta distance 216 between the vehicle 120 (e.g., the rear edge 120a of the vehicle 120) and the pedestrian zone 136 (e.g., the leading edge 222 of the pedestrian zone 136) equal to or greater than a delta threshold 218 (e.g., between approximately one inch and one foot, six inches, etc.). In other words, the electronic controller 150 of the illustrated example maintains the delta distance 216 between the pedestrian zone 136 (e.g., the leading edge 222 of the pedestrian zone 136) and (e.g., the rear edge 210 of) the vehicle 120 equal to or greater than the delta threshold 218. If the electronic controller 150 detects or determines that the delta distance 216 is less than the delta threshold 218, the electronic controller 150 dynamically modifies (e.g., increases or decreases) the sensing distance 138 of the pedestrian zone 136 relative to the dock face 112 so that the delta distance 216 between the vehicle 120 and the pedestrian zone 136 is equal to or greater than the delta threshold 218. In other words, by way of example, the leading edge 222 of the pedestrian zone 136 effectively moves relative to (e.g., toward and away from) the dock face 112 as the vehicle 120 moves relative to (e.g., toward and away from) the dock face 112.

Figure 3:
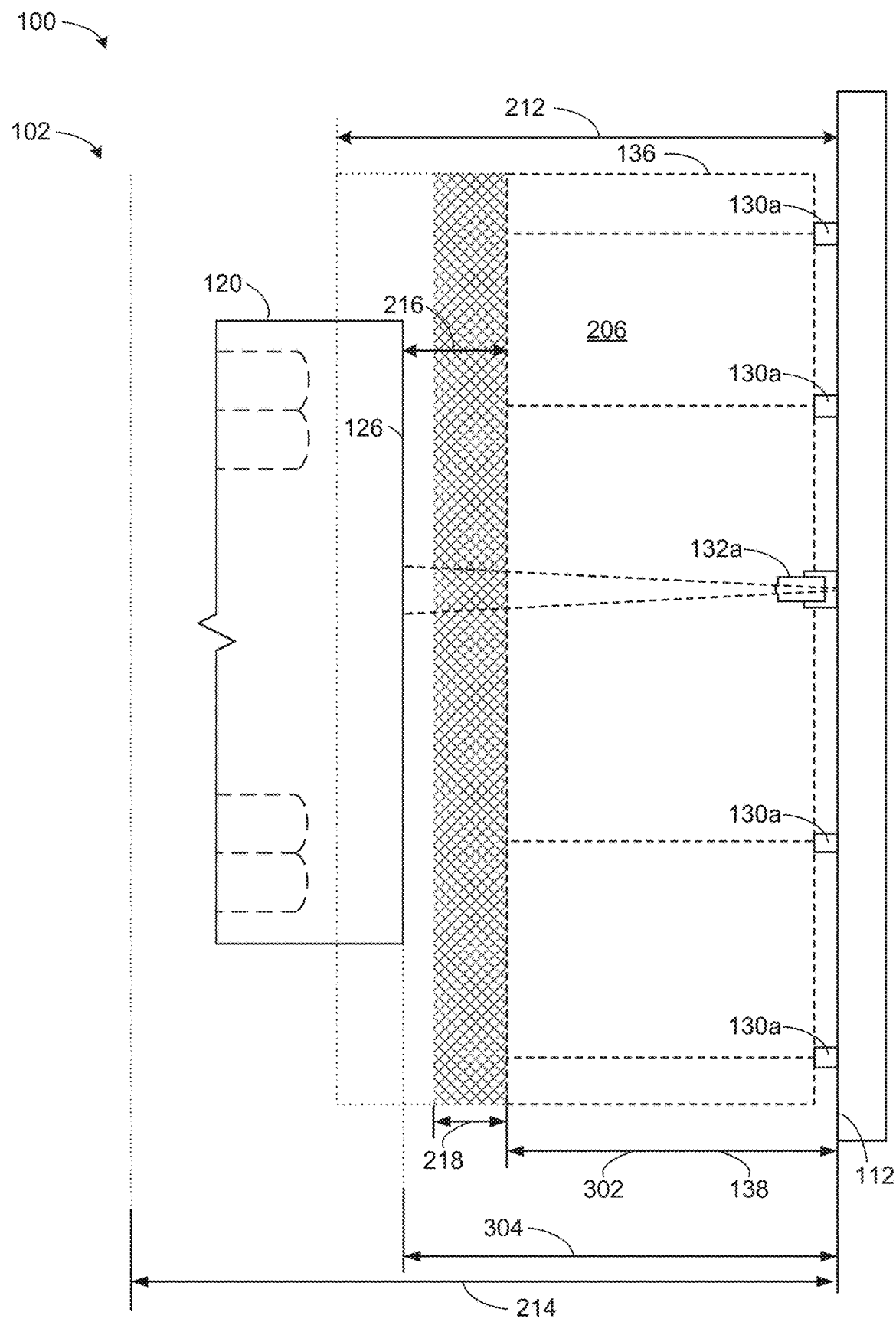
FIG. 3 is a plan view of the example loading dock of FIG. 1 showing an example pedestrian zone of the example safety system at a second sensing distance.

FIG. 3 is another plan view of the example loading dock 100 of FIGS. 1 and 2, but showing the sensing distance 138 of the pedestrian zone 136 at a second distance 302 from the dock face 112. The second distance 302 of the illustrated example is less than the first distance 212. For example, the second distance 302 can be between approximately 2 feet and 6 feet from the dock face 112 and the first distance 212 is approximately between 8 feet and 6 feet from the dock face 112. The pedestrian zone 136 of FIG. 3 has a reduced area or reduced sensing distance 138. The sensing distance 138 of FIG. 3 is less than the sensing distance 138 of FIG. 2. For example, as the vehicle 120 moves toward the dock face 112, the electronic controller 150 of the illustrated example adjusts (e.g., decreases) the sensing distance 138 of the pedestrian zone 136 based on a second distance 304 of the vehicle 120 relative to the dock face 112. Thus, the electronic controller 150 of the illustrated example collapses the pedestrian zone 136 as the vehicle 120 moves toward the dock face 112. For example, electronic controller 150 collapses the pedestrian zone 136 having the sensing distance 138 at the first distance 212 as shown, for example, in FIG. 2 (e.g., based on the distance 214 of the vehicle 120) to the pedestrian zone 136 having the sensing distance 138 at the second distance 302 as shown, for example, in FIG. 3 (e.g., based on the second distance 304 of the vehicle 120) when the vehicle 120 moves toward the dock face 112.

In some examples, the electronic controller 150 of the illustrated example continuously adjusts the sensing distance 138 of the pedestrian zone 136 until the vehicle 120 is restrained at the loading dock 100 via the vehicle restraint 124 and/or the vehicle is parked adjacent the doorway 104 of the loading dock 100. By continuously reducing a size or area of the pedestrian zone 136 as the vehicle 120 moves toward the dock face 112, the monitoring and alert system 102 of the illustrated example can monitor for a presence of the person 134 until the vehicle 120 is adjacent the doorway 104 of the dock face 112 and/or is engaged by the vehicle restraint 124. Unlike known pedestrian safety systems that disable a pedestrian zone to avoid inadvertent or false alarms from being triggered due a vehicle (e.g., the vehicle 120) entering a pedestrian zone as the vehicle approaches the doorway 104, the monitoring and alert system 102 of the illustrated example continuously monitors for pedestrian presence until a vehicle is parked or restrained at the dock face 112, thereby improving the accuracy of the monitoring and alert system 102. In this manner, the monitoring and alert system 102 of the illustrated example prevents improper activation of the outputs signals 142-148 (e.g., alarms) of the outdoor signal device 140 that may otherwise occur if a vehicle (e.g., the vehicle 120) enters the pedestrian zone 136 and when no person is present in the pedestrian zone 136.

Figure 4:
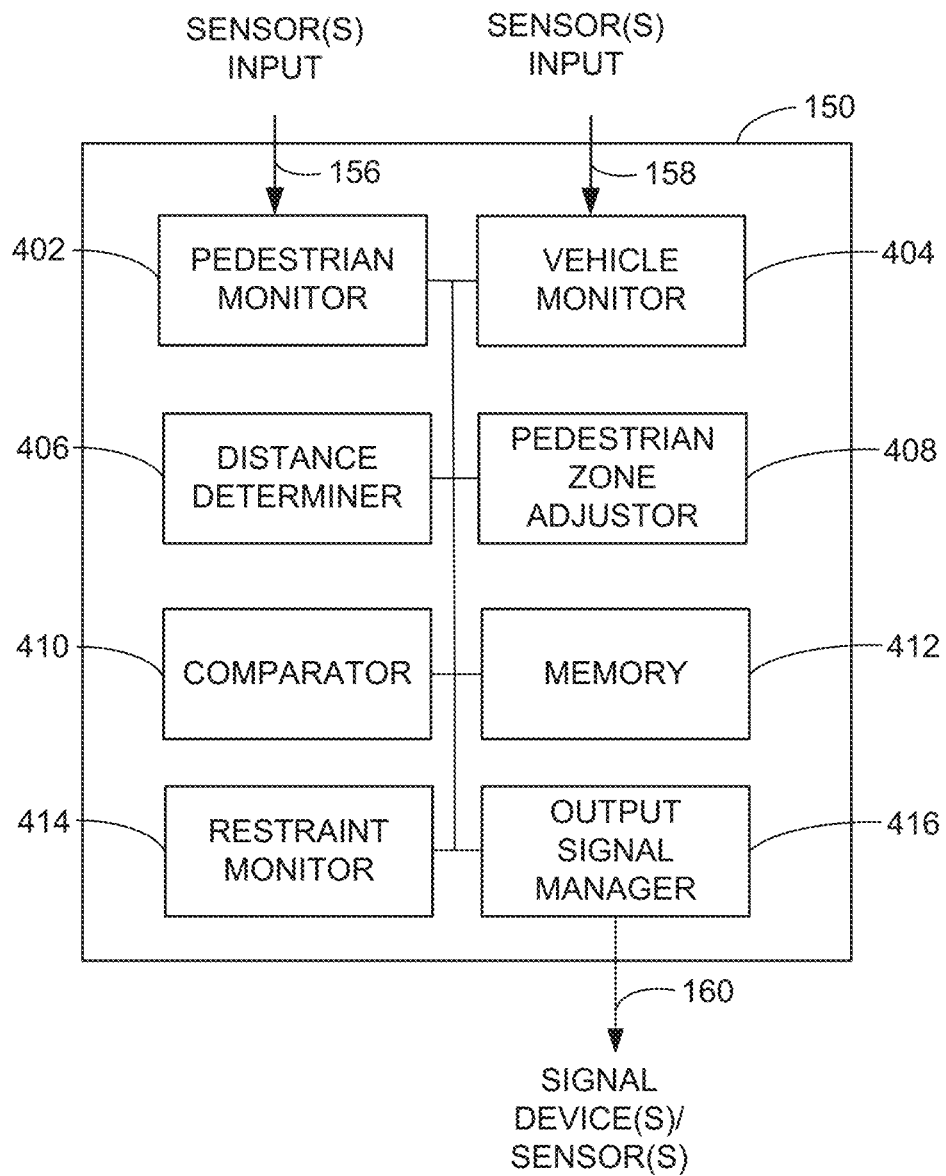
FIG. 4 is a block diagram representative of an example implementation of an example controller that may be used to implement the example monitoring and alert system of FIGS. 1-3.

FIG. 4 is a block diagram representative of an example implementation of the electronic controller 150 of FIGS. 1-4. The example electronic controller 150 of the illustrated example includes an example pedestrian monitor 402, an example vehicle monitor 404, an example distance determiner 406, an example pedestrian zone adjustor 408, an example comparator 410, an example memory 412, an example restraint monitor 414, and an example output signal manager 416. In some examples, the example pedestrian monitor 402, the example vehicle monitor 404, the example distance determiner 406, the example pedestrian zone adjustor 408, the example comparator 410, the example memory 412, the example restraint monitor 414, and the example output signal manager 416 are in communication (e.g., via a communication bus 418, by writing and reading data from a memory, etc.). The electronic controller 150 of the illustrated example is communicatively coupled (e.g., via an input/output interface) to one or more loading dock devices such as, for example, one or more of the pedestrian scanner system 130, the vehicle sensor system 132, the outdoor signal device 140, the vehicle restraint 124, and/or any other device that may be used in conjunction with the loading dock 100 of FIGS. 1-3.

The pedestrian monitor 402 of the illustrated example determines the presence (or absence) of a pedestrian or forktruck in the pedestrian zone 136 adjacent to the dock face 112 of the loading dock 100. To determine the presence and/or status of a person at the loading dock 100, the pedestrian monitor 402 of the illustrated example receives (e.g., via an input/output interface) the feedback signals 156 (e.g., associated with the feedback signals 156) provided by the pedestrian scanner system 130.

To determine whether a person is present or absent in the pedestrian zone 136, the pedestrian monitor 402 of the illustrated example analyzes the feedback signals 156 to determine the presence of a person in the pedestrian zone 136. For example, the pedestrian monitor 402 of the illustrated example determines that a person is present in the pedestrian zone 136 when one or more of the feedback signals 156 received from the pedestrian scanner systems 130 (e.g., the feedback signals 156 of the pedestrian sensors 130a) are representative of a first state (e.g., a triggered or interrupted state or condition). For example, a respective one of the feedback signals 156 from the pedestrian sensor 130a of the illustrated example can be a first output signal representative of a pedestrian being in the pedestrian zone 136. In some examples, the first signal is a logic "1" signal. In some examples, a respective one of the pedestrian sensors 130a can output a "detected" signal indicative of the person 134 being in the pedestrian zone 136.

The pedestrian monitor 402 determines or verifies the absence of a person in the pedestrian zone 136 when the feedback signals 156 received from the pedestrian scanner system 130 (e.g., all of the feedback signals 156 of the pedestrian sensors 130a) are representative of a second state (e.g., a non-triggered or uninterrupted state or condition). For example, the feedback signals 156 of each pedestrian sensor 130a outputs a second signal representative of no pedestrian being detected in the pedestrian zone 136. In such examples, the second signal is a logic "0" signal. In some examples, each pedestrian sensor 130a outputs a "not detected" signal indicative of no pedestrian being detected in the pedestrian zone 136.

Based on the analysis of the feedback signals 156 by the pedestrian monitor 402, the pedestrian monitor 402 of the illustrated example determines or outputs a pedestrian information signal (e.g., a pedestrian present signal or a no pedestrian present signal). For example, the pedestrian monitor 402 provides or communicates pedestrian information data determined by the pedestrian monitor 402 to the output signal manager 416. In some examples, the pedestrian monitor 402 communicates the pedestrian information data to the memory 412 and the output signal manager 416 retrieves the pedestrian information data from the memory 412.

The vehicle monitor 404 of the illustrated example detects a presence of a vehicle (e.g., the vehicle 120) relative to the loading dock 100 (e.g., the dock wall and/or the pedestrian zone 136) as the vehicle 120 moves toward the loading dock 100. In the illustrated example, the vehicle monitor 404 of the illustrated example determines that the vehicle 120 is present when the feedback signals 158 received from the vehicle sensor system 132 are representative of a first state (e.g., a triggered or interrupted state or condition) and determines or verifies the absence of the vehicle 120 when the feedback signals 158 received from the vehicle sensor system 132 are representative of a second state (e.g., a non-triggered or uninterrupted state or condition). In some examples, the vehicle sensor 132a outputs a first signal (e.g., the feedback signals 158) representative of a vehicle being present at the loading dock 100. In some examples, the first signal is a logic "1" signal. In some examples, the vehicle sensor 132a outputs a "detected" signal indicative of the vehicle being present at the loading dock 100 (e.g., adjacent the pedestrian zone). In some examples, the vehicle sensor 132a outputs a second signal (e.g., the feedback signals 158) representative of no vehicle being present at the loading dock 100. In such examples, the second signal is a logic "0" signal. In some examples, the second signal is a "not present" signal indicative of no vehicle being detected at the loading dock 100. The vehicle monitor 404 of the illustrated example provides or communicates to the sensor manager 416 a vehicle information signal (e.g., a vehicle presence signal or a no-vehicle presence signal). In some examples, the vehicle monitor 404 communicates the vehicle presence data to the memory 412 and the output signal manager 416 retrieves the vehicle presence data from the memory 412.

Additionally, when the vehicle monitor 404 detects the presence of the vehicle 120 at the loading dock 100, the monitoring or alert system 102 of the illustrated example determines a location or a position (e.g., a distance) of a vehicle relative to the dock face 112 and/or the pedestrian zone 136. For example, the distance determiner 406 of the illustrated example determines when the vehicle 120 is in the vicinity of (e.g., immediately adjacent or near) the pedestrian zone 136. In some examples, the distance determiner 406 detects or determines a distance (e.g., the distance 214, the distance 304, etc.) of the vehicle 120 relative to the dock face 112 based on the feedback signals 158 of the vehicle sensor system 132. For example, the distance determiner 406 determines the distance 214 of the vehicle 120 relative to the dock face 112 as shown in FIG. 2 and/or the second distance 304 of the vehicle 120 shown in FIG. 3 In some examples, the distance determiner 406 determines a distance (e.g., the distance 214 or the second distance 304) of the vehicle 120 relative to the dock face 112 using, for example, time-of-flight principle. For example, the distance determiner 406 measure a distance (e.g., the distance 214 of FIG. 2 or the second distance 304 of FIG. 3) between the dock face 112 and the vehicle 120 based on a time difference between an emission of the sensing projection 202 from the vehicle sensor 132a and a return of the sensing projection 202 to the vehicle sensor 132a after being reflected by the vehicle 120.

The pedestrian zone adjustor 408 of the illustrated example adjusts the sensing distance 138 of the pedestrian zone 136 based on the location or distance (e.g., the first distance 212, the second distance 304, etc.) of the vehicle 120 relative to the dock face 112 determined by the distance determiner 406 (e.g., as the vehicle 120 moves toward the leading edge 222 of the pedestrian zone 136 and/or the dock face 112). Specifically, the pedestrian zone adjustor 408 dynamically or continuously adjusts (e.g. increases or decreases) the sensing distance 138 of the pedestrian zone 136 relative to the dock face 112 based on a location of the vehicle 120 relative to the pedestrian zone 136 and/or the dock face 112 as the vehicle 120 approaches the leading edge 222 of the pedestrian zone 136. The pedestrian zone adjustor 408 of the illustrated example dynamically adjusts the sensing distance 138 of the pedestrian zone 136 to maintain the delta distance 216 between the vehicle 120 (e.g., the rear edge 210 of the vehicle 120) and the pedestrian zone 136 (e.g., the leading edge 222 of the pedestrian zone 136) equal to or greater than the delta threshold 218.

To maintain the delta distance 216 equal to or greater than the delta threshold 218, the pedestrian zone adjustor 206 and/or the distance determiner 406 employs the comparator 410 to compare the sensing distance 138 of the pedestrian zone 136 and the detected distance (e.g., the distance 214 or 304) of the vehicle 120 relative to the dock face 112. Based on the difference between the detected distance (e.g., the distance 214 or 304) and the sensing distance 138, the pedestrian zone adjustor 206 and/or the distance determiner 406 determines the delta distance 216 between the sensing distance 138 (e.g., the leading edge 222) of the pedestrian zone 136 and the detected distance of vehicle 120.

The pedestrian zone adjustor 408 continuously modifies or adjusts (e.g., increases or decreases) the sensing distance 138 of the pedestrian zone 136 provided by the pedestrian scanner system 130 based on the determined distance (e.g., the distances 214 or 304) of the vehicle 120 relative to the dock face 112. For example, if the pedestrian zone adjustor 408 and/or the distance determiner 406 determines that the delta distance 216 (e.g., the gap) is equal to or greater than the delta threshold 218, the pedestrian zone adjustor 408 causes the pedestrian scanner system 130 to generate the pedestrian zone 136 having the sensing distance 138 at a first distance (e.g., the first distance 212 as shown, for example, in FIG. 2). If the pedestrian zone adjustor 408 and/or the distance determiner 406 determines that the delta distance 216 between the pedestrian zone 136 and the vehicle 120 is less than the delta threshold 218, the electronic controller 150 causes the pedestrian scanner system 130 to generate the pedestrian zone 136 having the sensing distance 138 at a second distance different than the first distance (e.g., the second distance 302 as shown, for example, in FIG. 3). Thus, as the vehicle 120 moves toward the dock face 112, the pedestrian zone adjustor 408 of the illustrated example continuously reduces the sensing distance 138 and, thus, the pedestrian zone 136, until the vehicle 120 reaches the dock face 112 and/or the vehicle restraint 124 engages or secures the vehicle 120 to the dock face 112.

The pedestrian zone adjustor 408, the distance determiner 406, and/or the comparator 410 can retrieve the delta threshold 218 from the memory 412. In some examples, the delta threshold 218 may be stored in the memory 412 via a user input, the electronic controller 150 and/or any other electronic device.

In some examples, to adjust the sensing distance 138 of the pedestrian zone 136, the pedestrian zone adjustor 408 and/or the distance determiner 406 of the illustrated example filters the feedback signals 156 from the pedestrian sensors 130a to vary or adjust the sensing distance 138 of the pedestrian zone 136 from the dock face 112. For example, the electronic controller 150 can employ time of flight principle to determine and/or adjust the sensing distance 138 of the pedestrian zone 136 from the dock face 112. For example, based on the determined sensing distance 138, the electronic controller 150 of the illustrated example ignores feedback signals 156 from the pedestrian sensors 130a indicative of a presence of an object at a location or distance from the dock face 112 that is greater than the determined sensing distance 138 and only processes the feedback signals 156 from the pedestrian sensors 130a that are equal to or less than the determined sensing distance 138. For example, pedestrian sensors 130a can be calibrated to identify various sensing distances 138 between the dock face 112 and the leading edge 222 of the pedestrian zone 136 based on time differences between emissions of signals (e.g., sensing beams) from the pedestrian sensors 130a and the return of the signals to the pedestrian sensors 130a after being reflected by an object or pedestrian (e.g., positioned or located in the pedestrian zone 136).

In some examples, each of the pedestrian sensors 130a senses a different distance from the dock face 112. In some such examples, to adjust the sensing distance 138 of the pedestrian zone 136, the pedestrian zone adjustor 408 deactivates respective ones of the pedestrian sensors 130a of the sensing field 204 extending a distance greater than the distance of the vehicle 120 relative to the dock face 112 that is determined by the distance determiner 406, and activating the respective ones of the pedestrian sensors 130a of the sensing field 204 that are less than the distance of the vehicle 120 relative to the dock face 112 determined by the distance determiner 406. The pedestrian zone adjustor 408 can deactivate the pedestrian sensors 130a by removing power to the pedestrian sensors 130a or ignoring feedback signals 156 from the pedestrian sensors 130a.

Based on the pedestrian information data and the vehicle information data provided by the pedestrian monitor 402 and the vehicle monitor 404, respectively, the output signal manager 416 of the illustrated example controls the outdoor signal device 140. For example, the output signal manager 416 of the illustrated example activates the first output signal 142 (e.g., a green light) when the pedestrian monitor 402 determines or verifies that a person is not present in the pedestrian zone 136, and the vehicle monitor 404 determines that a vehicle is not present or parked (e.g., stationary) at the loading dock 100. In some examples, the output signal manager 416 of the illustrated example activates the first output signal 142 (e.g., a green light) when the pedestrian monitor 402 determines or verifies that a person is not present in the pedestrian zone 136, and the vehicle monitor 404 determines that a vehicle is moving in the forward direction 118 away from the dock face 112. In some examples, the output signal manager 416 of the illustrated example activates the second output signal 144 (e.g., a yellow light) when the pedestrian monitor 402 determines that a person is not present in the pedestrian zone 136 and the vehicle monitor 404 detects a vehicle moving toward the dock face 112 and/or the vehicle 120 is parked (e.g., stationary) at the loading dock 100. In some examples, the output signal manager 416 of the illustrated example activates the third output signal 146 (e.g., a red light) when the pedestrian monitor 402 detects a person in the pedestrian zone 136, and the vehicle monitor 404 does not detect a vehicle moving in the rearward direction 122 toward the dock face 112 of the loading dock 100. In some examples, the output signal manager 416 of the illustrated example activates the fourth output 148 (e.g., an audible alarm) when the pedestrian monitor 402 detects a person in the pedestrian zone 136, and the vehicle monitor 404 detects a vehicle moving in the rearward direction 122 toward the dock face 112 of the loading dock 100.

In some examples, the electronic controller 150 determines whether to persist and/or otherwise continue monitoring the monitoring and alert system 102. For example, the electronic controller 150 may determine to discontinue monitoring the monitoring and alert system 102 based on a user input, receiving continuing communication (e.g., a communication heartbeat signal, sensor information, etc.) from a sensor communicatively coupled to the monitoring and alert system 102, etc. For example, the electronic controller 150 may discontinue monitoring the monitoring and alert system 102 when the vehicle restraint 124 is in engagement with the vehicle 120. For example, the restraint monitor 414 monitors the vehicle restraint 124 of the loading dock 100 to determine when the vehicle restraint 124 is in an operative condition or a stored condition. For example, the vehicle restraint 124 restrains or prevents departure of the vehicle 120 relative to the dock face 112 when the vehicle restraint is in the operative condition and the allows the vehicle 120 to move (e.g., depart) relative to the dock face 112 when the vehicle restraint 124 is in the stored position. The restraint monitor 414 of the illustrated example can receive one or more signals from a sensor associated with the vehicle restraint 124 to detect or determine when the vehicle restraint 124 is in the operative position or the stored position. For example, the restraint monitor 414 receives a first signal having a value of "1" when the vehicle restraint 124 is in the operative condition and receives a second signal having a value of "0" when the vehicle restraint 124 is in the stored condition. In some examples, the restraint monitor 414 communicates the condition of the vehicle restrain 124 to the output signal manager 416. In some such examples, the output signal manager 416 of the illustrated example activates the third output signal 146 (e.g., a red light) when the restraint monitor 414 detects that the vehicle restraint 124 is in the operative condition.

While an example manner of implementing the electronic controller 150 of FIGS. 1-3 is illustrated in FIG. 4, one or more of the elements, processes and/or devices illustrated in FIG. 4 may be combined, divided, re-arranged, omitted, eliminated and/or implemented in any other way. Further, the example pedestrian monitor 402, the example vehicle monitor 404, the example distance determiner 406, the example pedestrian zone adjustor 408, the example comparator 410, the example memory 412, the example restraint monitor 414, and the example alert output manager 416 and/or, more generally, the example electronic controller 150 of FIG. 4 may be implemented by hardware, software, firmware and/or any combination of hardware, software and/or firmware. Thus, for example, any of the example pedestrian monitor 402, the example vehicle monitor 404, the example distance determiner 406, the example pedestrian zone adjustor 408, the example comparator 410, the example memory 412, the example restraint monitor 414, and the example signal manager 416 and/or, more generally, the example electronic controller 150 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pedestrian monitor 402, the example vehicle monitor 404, the example distance determiner 406, the example pedestrian zone adjustor 408, the example comparator 410, the example memory 412, the example restraint monitor 414, and the example alert output manager is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic controller 150 of FIGS. 1-3 may include one or more elements, processes and/or devices in addition to, or instead of, those illustrated in FIG. 4, and/or may include more than one of any or all of the illustrated elements, processes and devices.

Figure 5A:
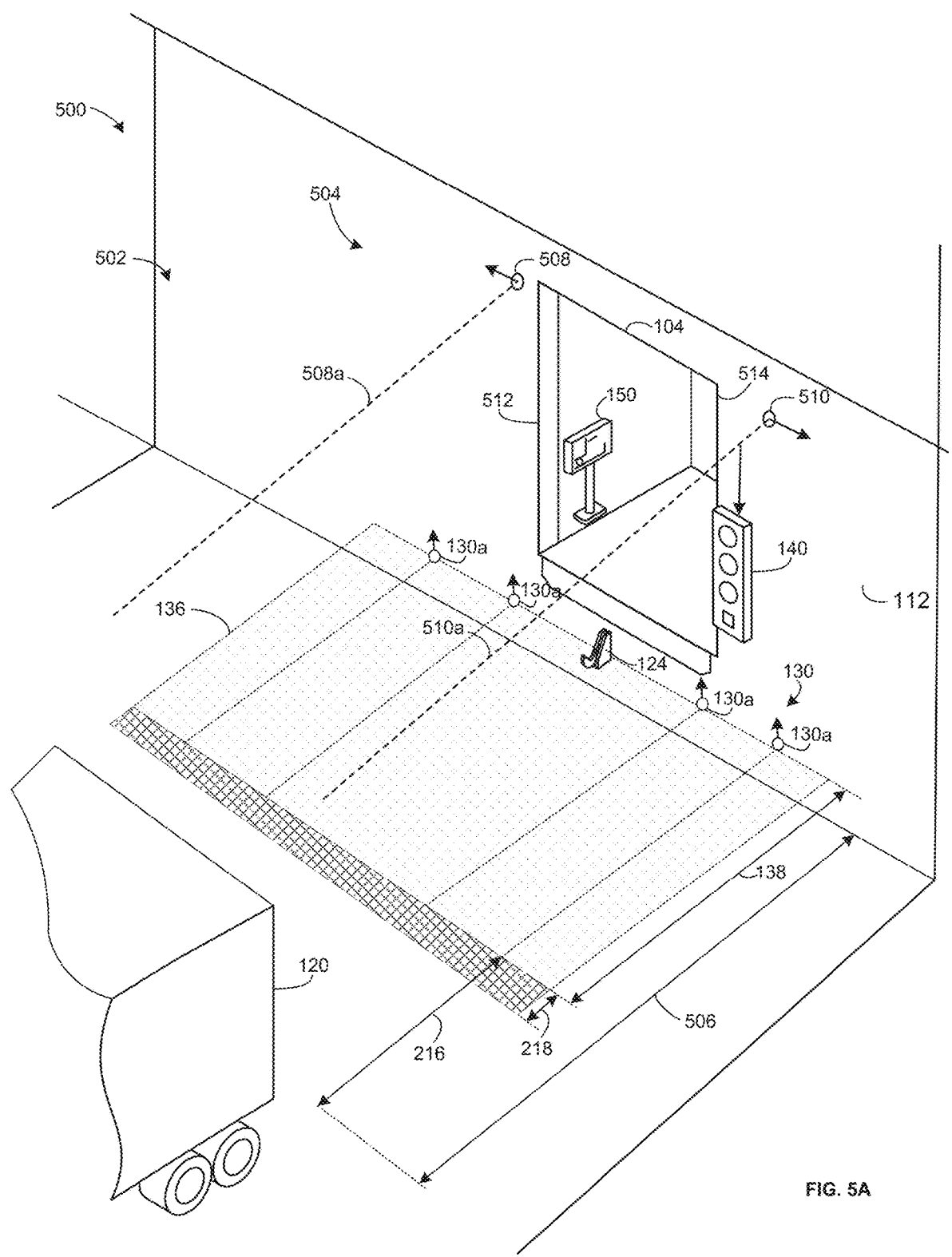
FIG. 5A is a perspective view of another example loading dock implemented with another safety system disclosed herein.
Figure 5B:
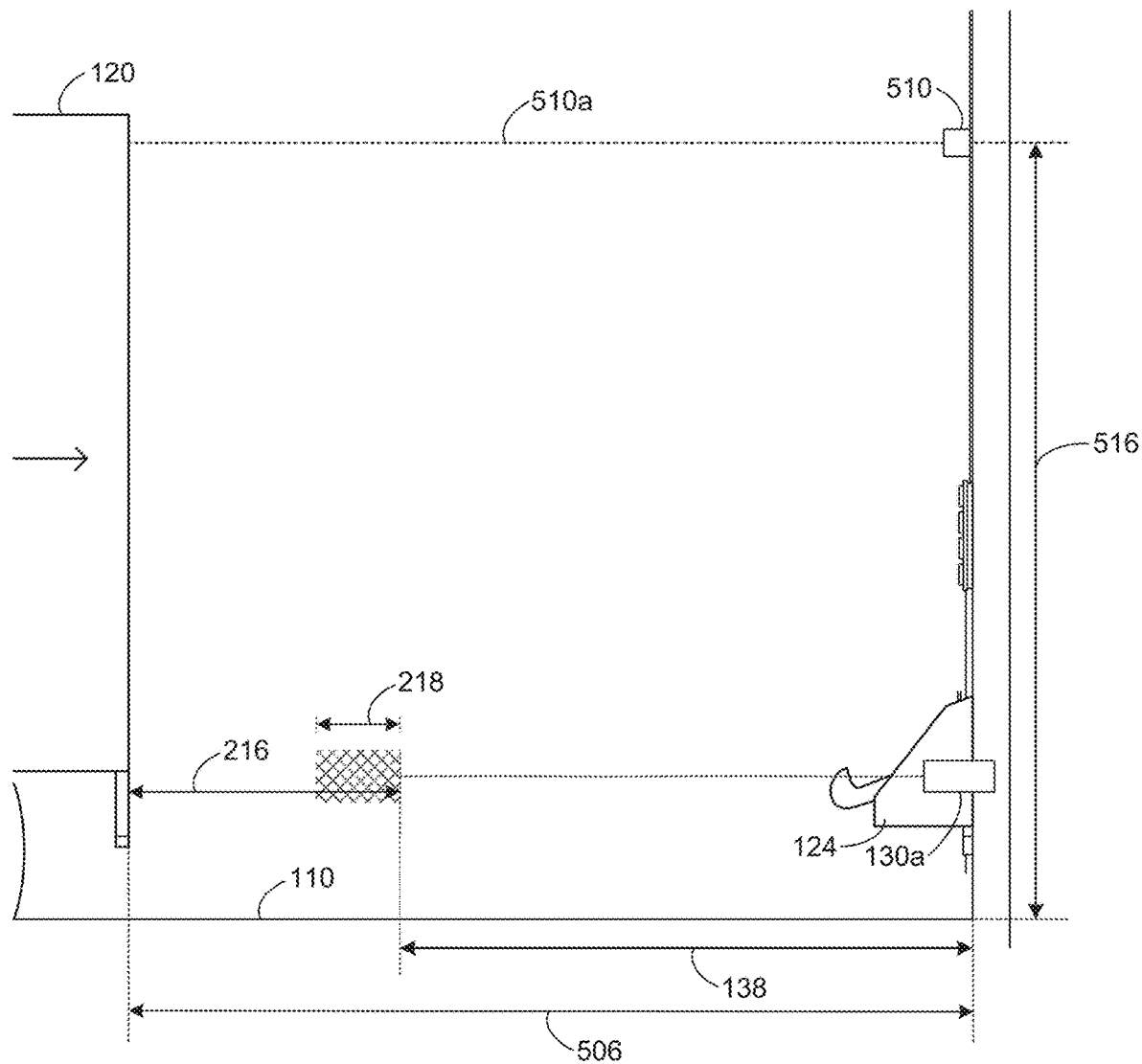
FIG. 5B is a side view of the example loading dock of FIG. 5A.
Figure 6A:
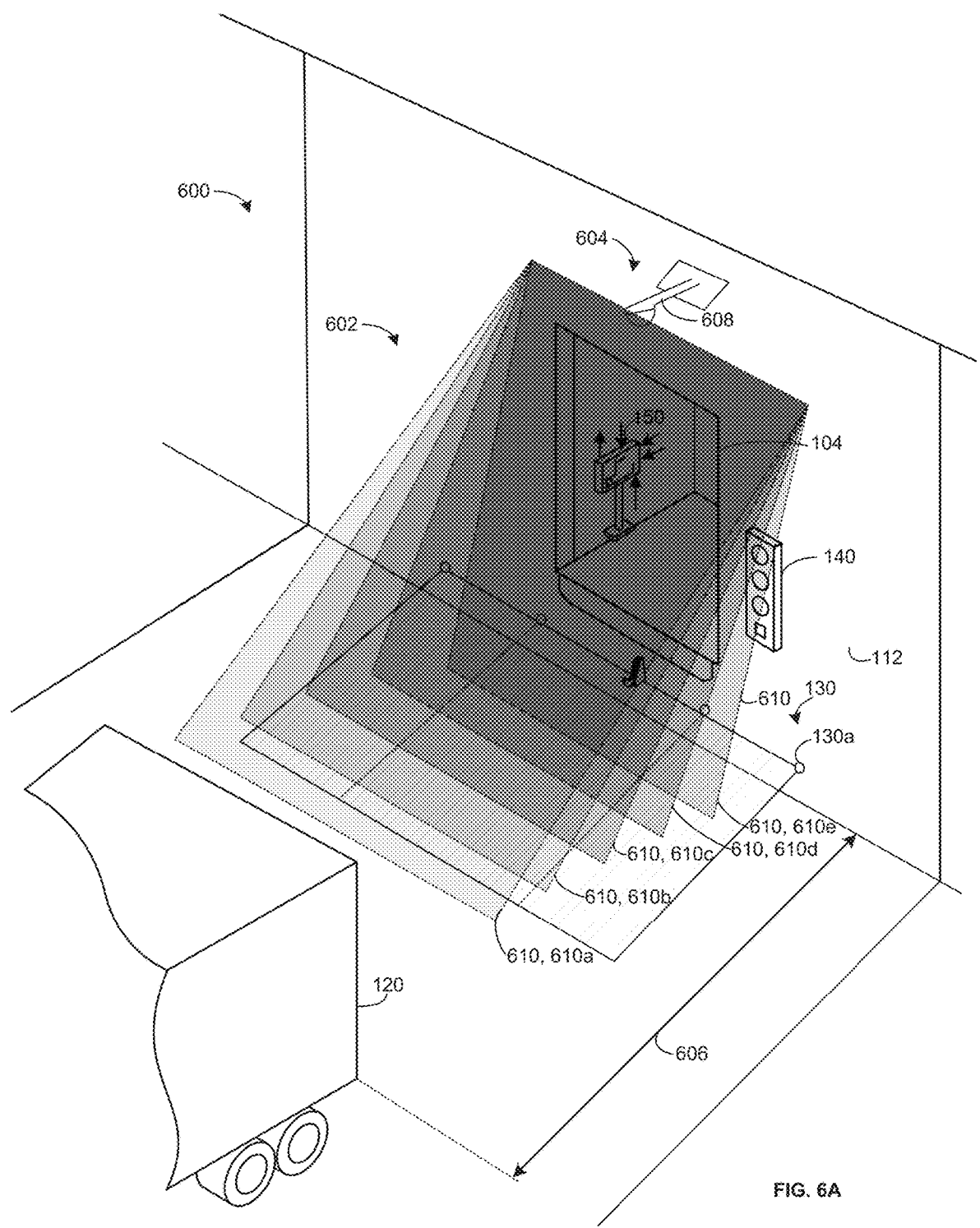
FIG. 6A is a perspective view of another example loading dock implemented with another safety system disclosed herein.
Figure 6B:
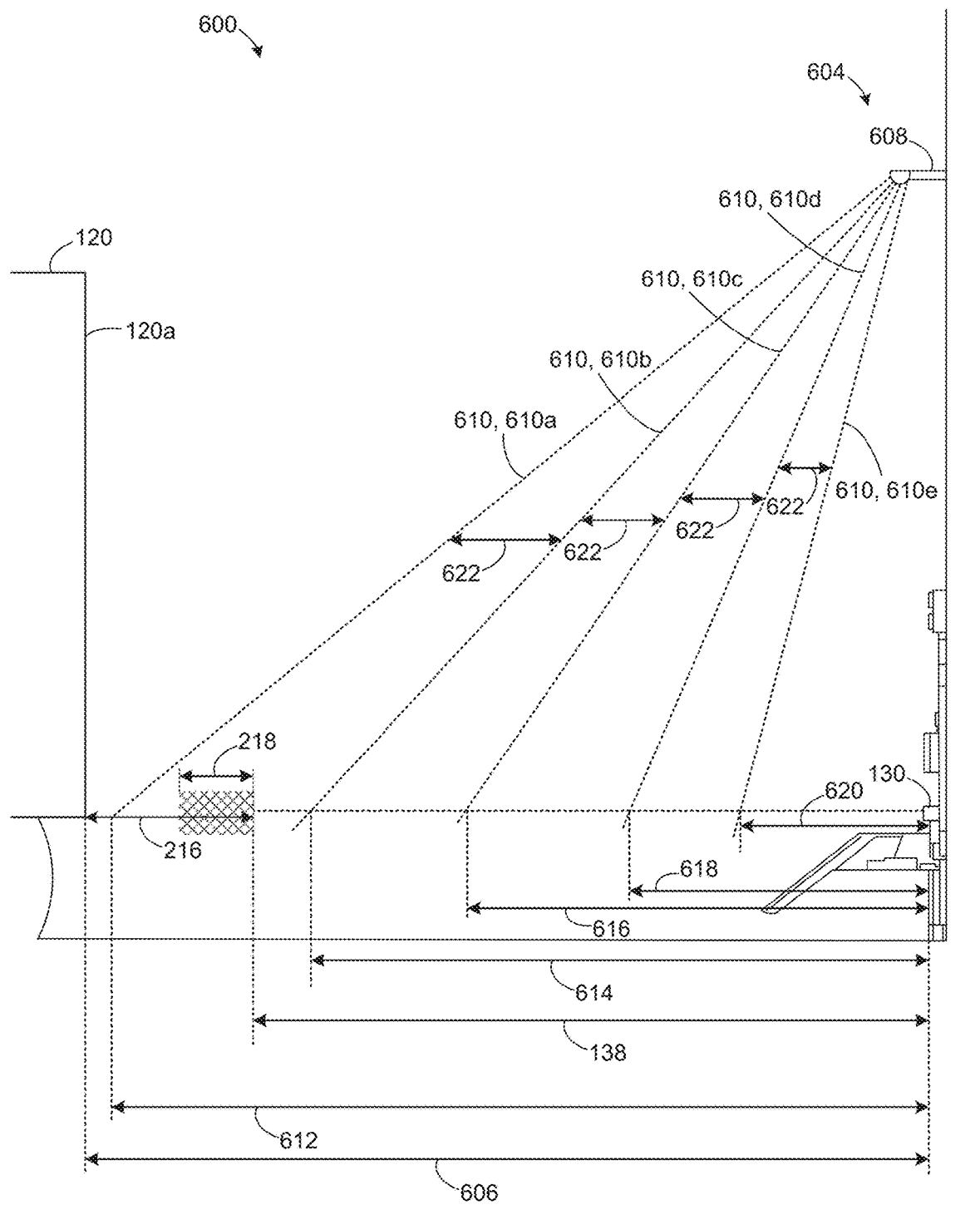
FIG. 6B is a side view of the example loading dock of FIG. 6A.
Figure 6C:
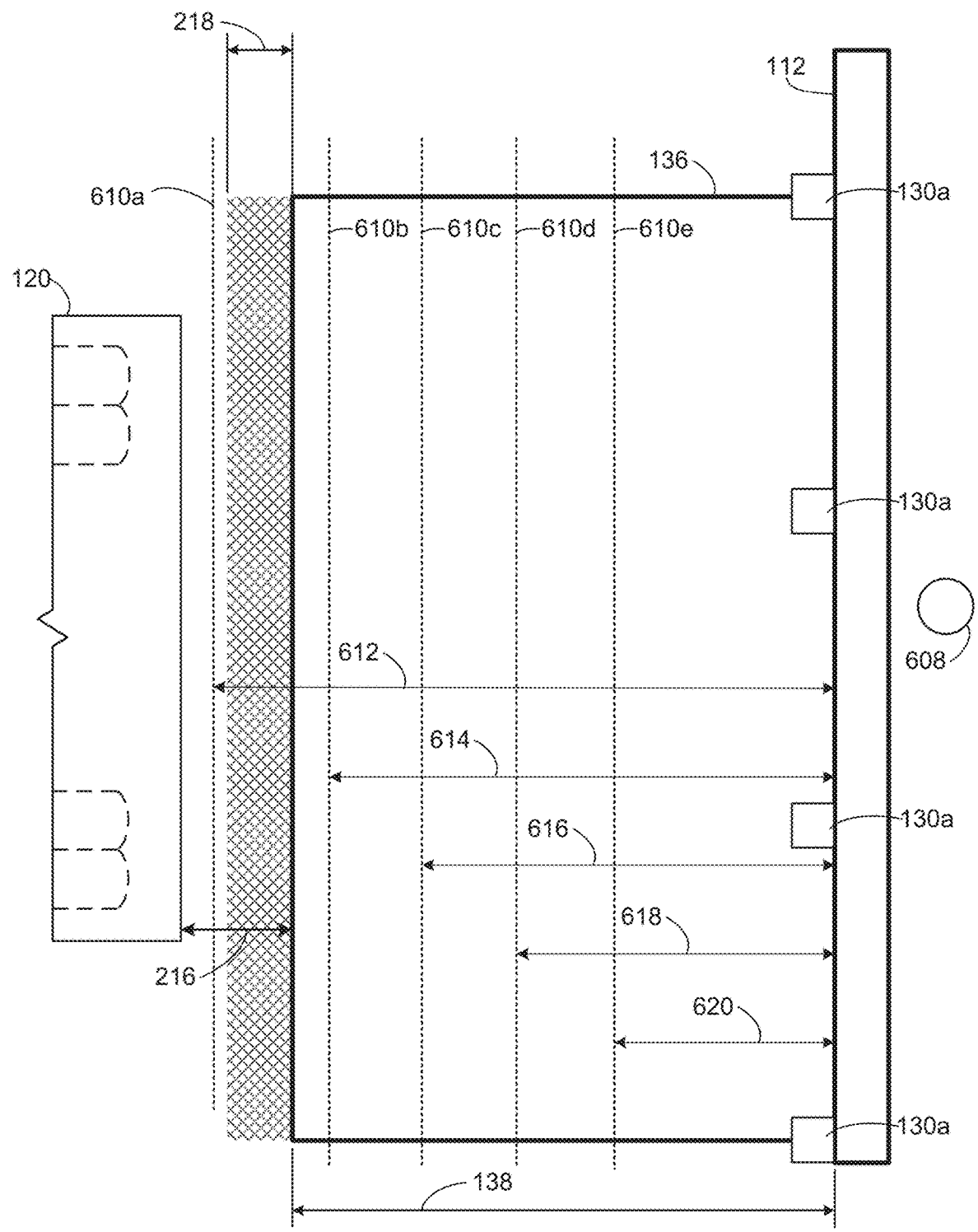
FIG. 6C is a plan view of the example loading dock of FIG. 6A.
Figure 7A:
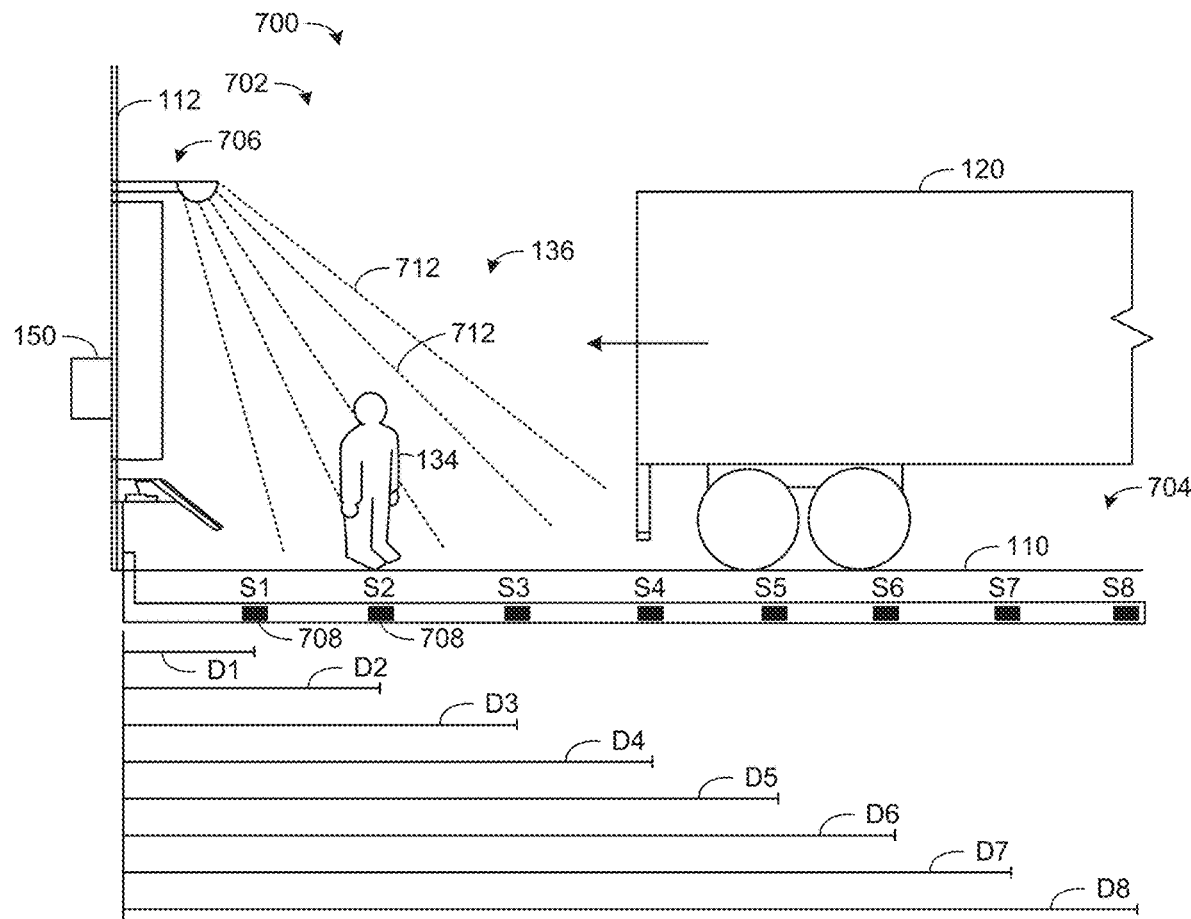
FIG. 7A is a side view of another example loading dock implemented with another safety system disclosed herein.
Figure 7B:
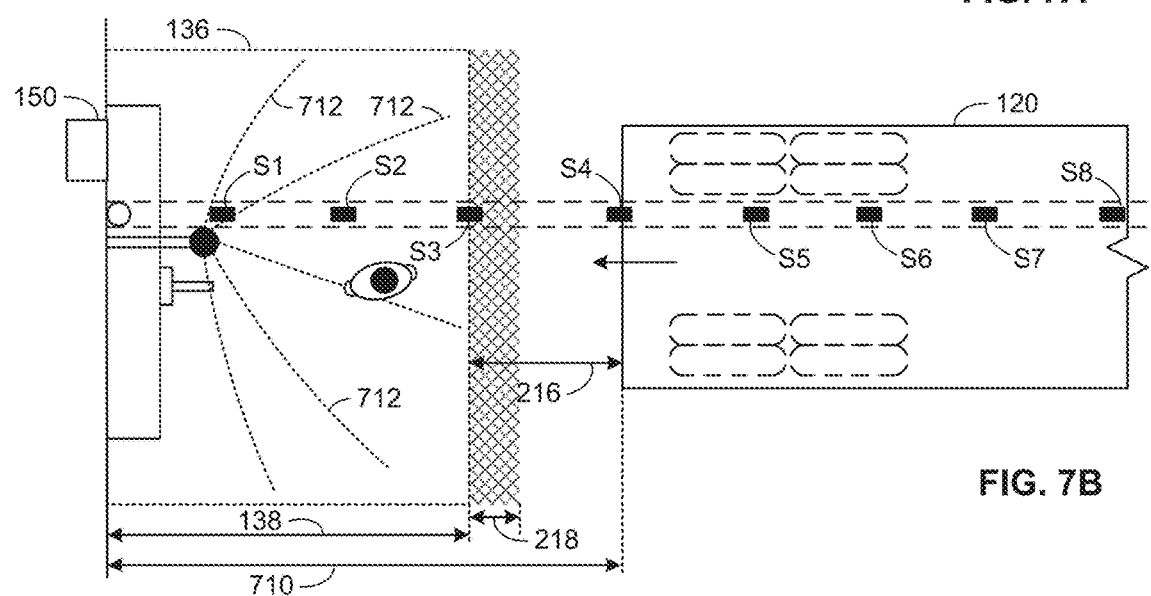
FIG. 7B is a plan view of the example loading dock of FIG. 7A.

FIGS. 5A-5C, 6A-6B, and 7A-7B illustrate other monitoring and alert systems 502-702 disclosed herein. Many of the components of the example monitoring and alert systems 502-702 of FIGS. 5A-5C, 6A-6B, and 7A-7B are substantially similar or identical to the components described above in connection with FIGS. 1-4. As such, those components will not be described in detail again below. Instead, the interested reader is referred to the above corresponding descriptions for a complete written description of the structure and operation of such components. To facilitate this process, similar or identical reference numbers will be used for like structures in FIGS. 5A-5C, 6A-6B, and 7A-7B as used in FIGS. 1-4. The monitoring and alert systems 502-702 of FIGS. 5A-5B, 6A-6C and 7A-7B illustrate various vehicle sensor systems 504-704 that may be used to implement the monitoring and alert systems 502-702. FIGS. 7A-7C further illustrate a pedestrian scanner system 706 different than the pedestrian scanner system 130 of FIGS. 1-4.

FIGS. 5A-5C illustrate another example loading dock 500 including a monitoring and alert system 502 disclosed herein. The example monitoring and alert system 502 of the illustrated example is substantially similar (e.g., identical) to the monitoring and alert system 102 of FIGS. 1-4 except the monitoring and alert system 502 of the illustrated example employs a vehicle sensor system 504. The monitoring and alert system 502 of the illustrated example employs the vehicle sensor system 504 to detect a presence of a vehicle 120 at the loading dock 500 and/or to detect a distance 506 of the vehicle 120 relative to a dock face 112 of the loading dock 500. The vehicle sensor system 504 of the illustrated example employs a first vehicle sensor 508 and a second vehicle sensor 510. The first vehicle sensor 508 is positioned adjacent to a first lateral edge 512 of the doorway 104 and the second vehicle sensor 510 is positioned adjacent a second lateral edge 514 of the doorway 104 opposite the first lateral edge 512. To detect the presence of the vehicle 120 at the loading dock 500, the first vehicle sensor 508 projects a first sensing projection 508a (e.g., a light beam) and the second vehicle sensor 510 projects a second sensing projection 510a (e.g., a second light beam).

Referring FIG. 5B, the first and second vehicle sensors 508, 510 of the illustrated example are located or mounted at an elevation 516 (e.g., greater than 7 feet) relative to the driveway 110 such that a pedestrian (e.g., the person 134) in the pedestrian zone 136 cannot interrupt the first and second sensing projections 508a, 510a (e.g., a sensing field) of the first and second vehicle sensors 508, 510. In this manner, a vehicle (e.g., the vehicle 120), and not a pedestrian, can only trigger the first and second vehicle sensors 508, 510 (e.g., interrupts the first and second sensing projections 508a, 510a). In other words, a pedestrian standing in the pedestrian zone 136 cannot trigger the first and second vehicle sensors 508, 510.

In operation, the vehicle sensor system 504 of the illustrated example detects the presence of the vehicle 120 at the loading dock 500 when both the first and second sensing projections 508a and 510a are interrupted contemporaneously (e.g., simultaneously). The electronic controller 150 of the illustrated example receives feedback signals 158 from the from the first vehicle sensor 508 and the second vehicle sensor 510 of the vehicle sensor system 504. For example, the electronic controller 150 (e.g., the vehicle monitor 404) determines that the vehicle 120 is present when the first vehicle sensor 508 and the second vehicle sensor 510 are contemporaneously in a triggered state and the electronic controller 150 determines that the vehicle 120 is not present when the first vehicle sensor 508 and the second vehicle sensor 510 are not contemporaneously in a triggered state. For example, the first vehicle sensor 508 and the second vehicle sensor 510 are in triggered states when the vehicle 120 interrupts the first and second sensing projections 508a and/or 510a. For example, the first vehicle sensor 508 and the second vehicle sensor 510 are in non-triggered states when the vehicle 120 does not interrupt the first and second sensing projections 508a and/or 510a. To determine a distance of the vehicle 120 relative to the dock face 112, the electronic controller 150 employs the time-of-flight principle provided by the first and second sensing projections 508a, 510a of the first and second vehicle sensors 508, 510. In some examples, the electronic controller 150 determines a velocity and/or speed of the vehicle 120 (e.g., based on the time-of-flight principle) as the vehicle 120 moves relative to the dock face 112.

The operation of the monitoring and alert system 502 of the illustrated example is identical to the operation of the monitoring and alert system 102 and/or the electronic controller 150 described above in connection with FIGS. 1-4. For example, the monitoring and alert system 502 of the illustrated example dynamically modifies the sensing distance 138 of the pedestrian zone 136 based on the distance 506 of the vehicle 120 relative to the dock face 112 determined by (e.g., feedback signals of) the vehicle sensor system 504 to maintain a delta distance 216 between the vehicle 120 and the pedestrian zone 136 equal to or greater than a delta threshold 218 as the vehicle 120 moves toward the dock face 112.

Referring to FIGS. 6A-6C, the loading dock 600 of FIGS. 6A-6C includes another example monitoring and alert system 602 disclosed herein. The example monitoring and alert system 602 of the illustrated example is substantially similar (e.g., identical) to the monitoring and alert system 102 of FIGS. 1-4 except the monitoring and alert system 602 of the illustrated example employs a vehicle sensor system 604. The monitoring and alert system 602 of the illustrated example employs the vehicle sensor system 604 to detect a presence of a vehicle 120 at the loading dock 600 and detect a distance 606 of the vehicle 120 relative to a dock face 112 of the loading dock 600. The vehicle sensor system 604 of the illustrated example employs a vehicle sensor 608 positioned adjacent to (e.g., above) the doorway 104. To detect the presence of the vehicle 120 and the distance 606 of the vehicle relative to the dock face 112, the vehicle sensor 608 of the illustrated example projects or emits a plurality of sensing planes 610.

Referring FIG. 6B, to detect the position of the vehicle 120 relative to the dock face 112 of the loading dock 600, each of the sensing planes 610 represents a different distance from the dock face 112. To enable the sensing planes 610 to detect different distances from the dock face 112, the sensing planes 610 of the illustrated example are different angles relative to the dock face 112 and/or the vehicle sensor 608. For example, the vehicle sensor 608 of the illustrated example emits: a first sensing plane 610a (e.g., at a first angle relative to the dock face 112) that projects or senses the vehicle 120 at a first distance 612 from the dock face 112; a second sensing plane 610b (e.g., at a second angle relative to the dock face 112 different than the first angle) that projects or senses the vehicle 120 at a second distance 614 from the dock face 112; a third sensing plane 610c (e.g., at a third angle relative to the dock face 112 different than the first and second angles) that projects or senses the vehicle 120 at a third distance 616 from the dock face 112; a fourth sensing plane 610d (e.g., at a fourth angle relative to the dock face 112 different than the first, second and third angles) that projects or senses the vehicle 120 at a fourth distance 618 from the dock face 112; and a fifth sensing plane 610e (e.g., at a fifth angle relative to the dock face 112 different than the first, second, third and fourth angles) that projects or senses the vehicle 120 at a fifth distance 620 from the dock face 112. The first distance 612 of the illustrated example is greater than the second distance 614, which is greater than the third distance 616, which is greater than the fourth distance 618, and which is greater than the fifth distance 620. In the illustrated example, the vehicle sensor 608 of the illustrated example provides or generates sensing planes 610a-610e (e.g., five sensing planes). However, in some examples, the vehicle sensor 608 may provide more than five sensing planes (e.g., 7 sensing planes, fifteen sensing planes, fifty sensing planes, etc.). The number of sensing planes determine the resolution of vehicle locations. A greater number of sensing planes 610 provides a greater resolution for determining the vehicle location or distance from the dock face 112. Additionally, each of the sensing planes 610a-610e are spaced apart by a gap 622. In some examples, the gap 622 may be greater than the delta threshold 218, less than the delta threshold 218, or equal to the delta threshold 218. In some examples a respective one of the gaps 622 may have a dimensional length or value that is different than another respective one of the gaps 622. In some examples, each of the gaps 622 has a different dimensional length or value.

The operation of the monitoring and alert system 502 of the illustrated example is substantially similar or identical to the operation of the monitoring and alert system 102 and/or the electronic controller 150 described above in connection with FIGS. 1-4. Referring to FIG. 6C, as the vehicle 120 moves toward the dock face 112, the vehicle 120 interrupts the first sensing plane 610a prior to interrupting the other sensing planes 610b-e. The electronic controller 150 of the illustrated example receives feedback signals from the from the vehicle sensor 608 indicative of the vehicle 120 being at the first distance 612 from the dock face 112 associated with the first sensing plane 610a. For example, the electronic controller 150 receives an input signal from vehicle sensor 608 indicative of the first sensing plane 610a being in triggered state (e.g., a signal value "1") and receives feedback signals from the vehicle sensor 608 indicative of the second, third, fourth and fifth sensing planes 610b-610e being in non-triggered states (e.g., signal values of "0"). Based on the feedback signals, the electronic controller 150 determines that the vehicle 120 is at the first distance 612 from the dock face 112. As the vehicle 120 continues to move toward the dock face 112, the vehicle 120 interrupts the second sensing plane 610b. The electronic controller 150 of the illustrated example receives the feedback signals (e.g., signal values "1") indicative of the first and second sensing planes 610a-610b being in triggered states (e.g. interrupted states) and feedback signals (e.g., signal values "0") indicative of the third, fourth and fifth sensing planes 610c-610e being in non-triggered states (e.g., non-interrupted states) to determine that the vehicle is at the second distance 614 form the dock face 112, and so forth. In operation, the monitoring and alert system 602 of the illustrated example dynamically modifies (e.g., reduces or collapses) the sensing distance 138 of the pedestrian zone 136 based on the distance (e.g., distances 612-620) of the vehicle 120 relative to the dock face 112 identified by the sensing planes 610a-e to maintain a delta distance 216 between the vehicle 120 and the pedestrian zone 136 equal to or greater than a delta threshold 218 as the vehicle 120 moves toward the dock face 112.

Referring to FIGS. 7A-7B, the loading dock 700 of the illustrated example includes another example monitoring and alert system 702 disclosed herein. The example monitoring and alert system 702 of the illustrated example is substantially similar (e.g., identical) to the monitoring and alert system 102 of FIGS. 1-4 except the monitoring and alert system 702 of the illustrated example employs a vehicle sensor system 704 and a pedestrian scanner system 706. The monitoring and alert system 702 of the illustrated example employs the vehicle sensor system 704 to detect a presence and a distance of the vehicle 120 relative to a dock face 112 of the loading dock 700. The vehicle sensor system 704 of the illustrated example employs a plurality of vehicle sensors 708 located along a driveway 110 of the loading dock 700. The vehicle sensor system 704 of the illustrated example includes sensors S1-S8. However, other examples can include more than eight sensors or less than eight sensors. The number of the vehicle sensors 708 determine resolution of vehicle location. Each of the vehicle sensors 708 is associated with a different distance relative to the dock face 112. In some examples, the vehicle sensors 708 are positioned beneath the driveway 110 of the loading dock 700.

The vehicle sensors 708 of the illustrated example are magnetic sensors (e.g., magnetic flux sensors). In some examples, the vehicle sensors 708 use a Hall effect transducer and measure a vector component of the magnetic field near the vehicle sensors 708. The vehicle sensors 708 measures either a relatively strong magnetic field around permanent magnets or electromagnets or measure a weak magnetic field such as the Earth's magnetic field. Such measurements allow each of the vehicle sensors 708 to provide feedback signals having either a first signal (e.g., a signal value "0") or a second signal (e.g., a signal value "1"). Thus, the vehicle 120 (e.g. being composed of metal) affects (e.g., a magnetic flux of) the outputs of the vehicle sensors 708. For example, the vehicle 120 triggers the vehicle sensors 708 when the vehicle 120 is positioned adjacent (e.g., over) the respective ones of the vehicle sensors 708. When the vehicle 120 is positioned away from respective ones of the vehicle sensors 708 (e.g., a distance of between approximately 3 inches and 1 foot), the respective ones of the vehicle sensors 708 are in the first state (e.g., a non-triggered state). When the vehicle 120 is adjacent (e.g., over or above, or less than 3 inches from) respective ones of the vehicle sensors 708, the respective ones of the vehicle sensors 708 of the illustrated example are in the second state (e.g., a triggered state).

The electronic controller 150 of the illustrated example receives the feedback signals from the vehicle sensors 708 and determines the distance of the vehicle 120 relative to the dock face 112 based on respective ones of the vehicle sensors 708 being in the first state or the second state as the vehicle 120 moves toward the dock face 112. In some examples, the vehicle sensors 708 of the illustrated example are triggered in descending order from S8 to S1 as the vehicle moves toward the dock face 112. The vehicle sensors S1-S8 are spaced at different respective distances D1-D8 relative to the dock face 112. Based on the feedback signals received by the electronic controller 150 from the vehicle sensors 708, the electronic controller 150 determines a distance (e.g., the distance 710) of the vehicle relative to the dock face 112. As shown in the illustrated example, the vehicle 120 is positioned over the vehicle sensors S4-S8. Thus, the vehicle sensors S4-S8 of the illustrated example provide the second signals (e.g., signal values "1" or signals indicative of the sensors S4-S8 being in the triggered state) to the electronic controller 150 and the vehicle sensors S3-S1 provide the first signals (e.g., signal values "0" or signals indicate of the vehicle sensors S1-S3 being in the non-triggered state) to the electronic controller 150. Based on the determination that the sensors S4-S8 are in the triggered states, the electronic controller 150 of the illustrated example determines that the vehicle is at a distance 710 (e.g., the distance D4) from the dock face 112.

The pedestrian scanner system 706 of the illustrated example provides a pedestrian zone 136 adjacent the dock face 112. The electronic controller 150 modifies or adjust a sensing distance 138 of the pedestrian zone 136 relative to the dock face 112 based on a detected distance 710 of the vehicle 120 relative to the dock face 112. For example, when the sensors S1-S8 are in non-triggered states, the electronic controller 150 determines that a vehicle 120 is not present at the loading dock 700. In some such examples, the electronic controller 150 of the illustrated example adjusts (e.g., increases) the sensing distance 138 to, for example, the sixth distance represented by the sensor S6. As the vehicle 120 moves toward the dock face 112 and travels over the sensor S3, the electronic controller 150 determines that the vehicle 120 is at the distance D3 from the dock face 112 and adjusts the sensing distance 138 of the pedestrian zone 136 such that a delta distance 216 between the vehicle 120 and the pedestrian zone 136 is equal to or greater than the delta threshold 218. The electronic controller 150 reduces the sensing distance 138 in this manner until the vehicle 120 is adjacent the doorway 104 and/or restrained to the dock face 112 via the vehicle restraint 124.

The pedestrian scanner system 706 of the illustrated example may include a sensing field 712a that includes plurality of sensing projections 712, each projecting a different distance from the dock face 112. In the illustrated example, the pedestrian scanner system 706 is located or mounted above the doorway 104 and projects the sensing projections 712 toward the driveway 110. As the vehicle 120 moves toward the dock face 112, the electronic controller 150 deactivates respective ones of the sensing projections 712 that extend a distance from the dock face 112 that is greater than the detected distance 710 of the vehicle 120 relative to the dock face 112 determined from the sensors S1-S8. The operation of the monitoring and alert system 702 of the illustrated example is identical to the operation of the monitoring and alert system 102 and/or the electronic controller 150 described above in connection with FIGS. 1-4. For example, the monitoring and alert system 702 of the illustrated example dynamically modifies the sensing distance 138 of the pedestrian zone 136 based on the detected distance 710 of the vehicle 120 (e.g., detected by the sensors S1-S8) relative to the dock face 112 and maintains the delta distance 216 between the vehicle 120 and the pedestrian zone 136 equal to or greater than a delta threshold 218 as the vehicle 120 moves toward the dock face 112.

In some examples, the pedestrian scanner system 130, 706 and/or the pedestrian monitor 402 provide means for generating a pedestrian zone adjacent the dock face 112 of the loading dock 112. In some examples, the pedestrian scanner system 130, 706 and/or the pedestrian monitor 402 provide means for sensing or detecting a pedestrian 134 in the pedestrian zone 136. In some examples, the vehicle sensor system 132, 504-704 and/or the vehicle monitor 404 provide means for sensing the vehicle 120 at the loading dock 100, 500-700. In some examples, the vehicle sensor system 132, 504-704, the vehicle monitor 404 and/or the distance determiner 406 provide means for determining a distance the vehicle 120 relative to the dock face 112 of the loading dock 100, 500-700. In some examples, the pedestrian zone adjustor 408 provides means for dynamically modifying or adjusting the sensing distance 138 of the pedestrian zone 136 relative to the dock face 112 based on a determined location of the vehicle 120 relative to the dock face. In some examples, the pedestrian zone adjustor 408, the distance determiner 406, and/or the comparator 412 provides means for maintaining the delta distance 216 between the vehicle 120 and the pedestrian zone 136 equal to or greater than a delta threshold 218. In some examples, the comparator 410 provides means for comparing the sensing distance 136 and a distance (e.g., the distance 214, 304, 506, 606, 710) of the vehicle 120 relative to the dock face 112. In some examples, the output signal manager 416 provides means for controlling the outdoor signal device 140.

Additionally, several examples have been described throughout this specification. Any features from any example can be included with, a replacement for, or otherwise combined with other features from other examples. In other words, the example disclosed herein are not mutually exclusive to each other. For example, the loading dock 100 of FIG. 1 can include the vehicle sensor systems 504-704 instead of the vehicle sensor system 132. In some examples, any one of the loading docks 100, 500 and 600 may include the pedestrian scanner system 706 of FIGS. 7A and 7B.

Figure 8:
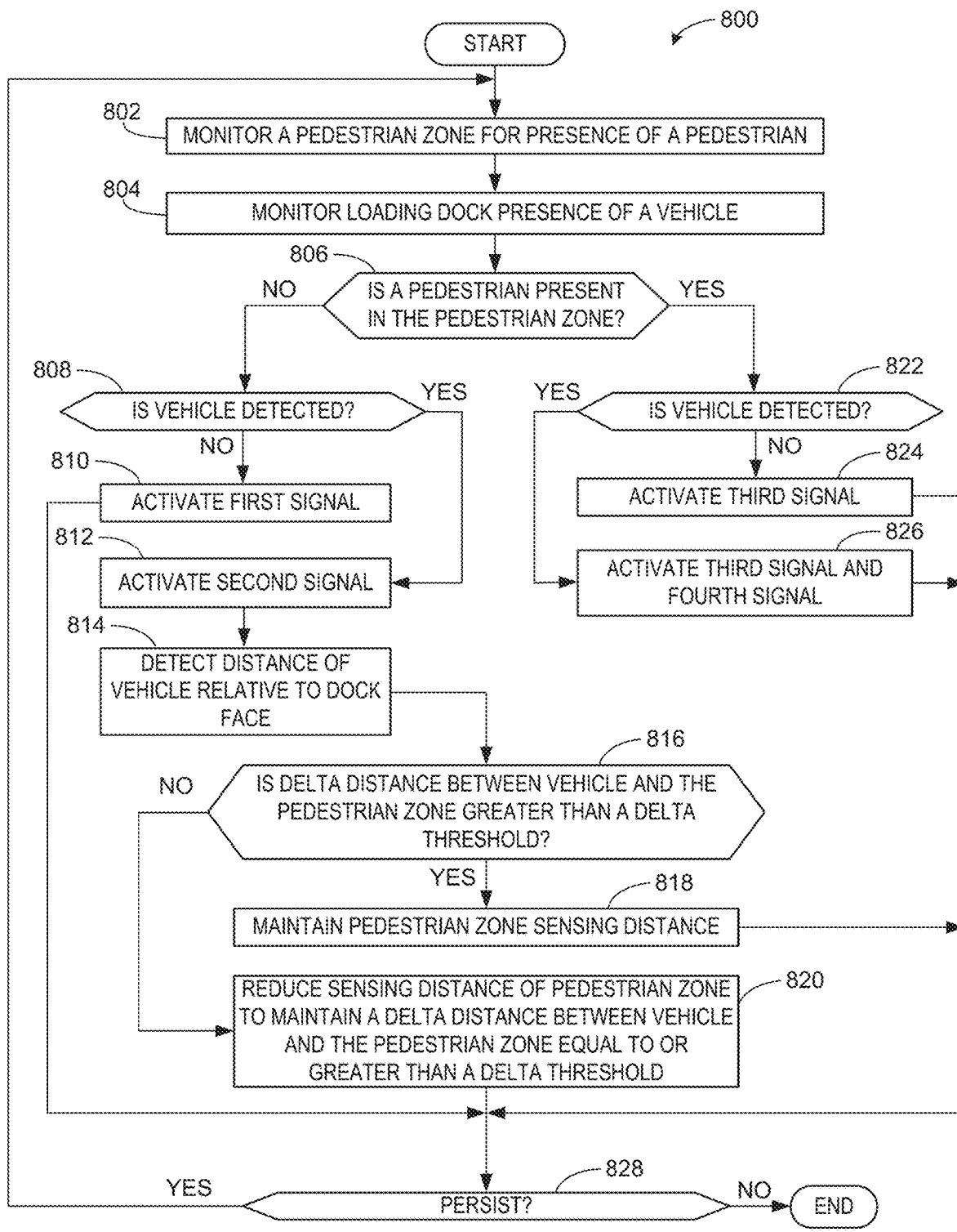
FIG. 8 is a flowchart representative of example machine readable instructions that may be executed to implement the example controller of FIG. 4.

A flowchart representative of example machine readable instructions which may be executed to implement the example electronic controller 150 of FIGS. 1-4, 5A-5B, 6A-6C and 7A-7B is shown in FIG. 8. The machine readable instructions may be a program or portion of a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example electronic controller 150 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Referring to FIG. 8, the program 800 begins when the example electronic controller 150 monitors the loading dock 100-700 for the presence of a person in the pedestrian zone 136 (block 802). For example, the vehicle monitor 404 of the illustrated examples of FIGS. 1-4, 5A-5B, 6A-6C and 7A-7B receives the feedback signals 156 from the pedestrian scanner system 130, 706 to determine the presence of the person 134 in the pedestrian zone 136. The electronic controller 150 further monitors the loading dock 100-700 for the presence of the vehicle 120 (block 804). For example, the vehicle monitor 404 receives feedback signals 158 from the vehicle sensor system 132, 504, 604, 704 to detect the presence of the vehicle 120 at the loading dock 100-700.

During monitoring, the electronic controller 150 detects if a person is present in the first pedestrian zone 128 (block 806). For example, the pedestrian monitor 402 receives feedback signals from the pedestrian scanner system 130, 706 to determine if the person 134 is present in the pedestrian zone 136. For example, if one or more of the feedback signal(s) provided by the pedestrian scanner system 130, 706 are representative of a triggered state (e.g., a signal value of "1"), the pedestrian monitor 402 determines that a pedestrian is present in the pedestrian zone 136. If all of the feedback signal(s) provided by the pedestrian sensors 132a or the feedback signal(s) provided by the pedestrian scanner system 706 are representative of non-triggered states (e.g., signal values of "0"), the pedestrian monitor 402 determines that a pedestrian is not present in the pedestrian zone 136.

If the electronic controller 150 determines that the person 134 is not present in the pedestrian zone 136 (block 806), the electronic controller 150 determines if a vehicle is present at the loading dock 100, 500-700 (block 808). For example, the vehicle monitor 404 determines if the vehicle 120 is present at the loading dock 100, 500-700 based on the feedback signals provided by the vehicle sensor system 132, 504, 604, 704. If the vehicle monitor 404 determines that the vehicle 120 is not present at the loading dock 100, 500-700 (block 808), the electronic controller 150 causes the outdoor signal device 140 to emit the first output signal 142 (block 810). In some examples, the electronic controller 150 causes the outdoor signal device 140 to emit the first output signal 142 when the vehicle monitor 404 determines that the vehicle 120 is moving in the forward direction 118 away from the dock face 112 (e.g., even if the person 134 is present within (e.g., within a perimeter of) the pedestrian zone 136).

If the electronic controller 150 detects the presence of the vehicle 120 at the loading dock 100, 500-700 (block 808), the electronic controller 150 of the illustrated example causes the outdoor signal device 140 to emit the second output signal 144 (block 812). In some examples, the electronic controller 150 can cause the outdoor signal device 140 to emit the second output signal 144 when the vehicle monitor 404 determines that the vehicle 120 is moving in the rearward direction 122 toward to the dock face 112.

Additionally, the electronic controller 150 determines a position of the vehicle 120 from the dock face 112 (block 814). In some examples, the distance determiner 406 determines a distance of the vehicle 120 relative to the dock face 112 based on feedback signals from the vehicle sensor system 132, 504, 604, 704.

Based on the detected position of the vehicle 120 relative to the dock face 112, the electronic controller 150 of the illustrated example determines if the delta distance 216 between the vehicle 120 and the pedestrian zone 136 is equal to or greater than a delta threshold 218 (block 816). For example, the distance determiner 406 and/or the pedestrian zone adjustor 408 determines or calculates the difference between the distance (e.g., the distance 214) of the vehicle 120 from the dock face 112 and the sensing distance 138 of the pedestrian zone adjustor 408 to determine the delta distance 216 between the vehicle 120 and the pedestrian zone 136. After the delta distance 216 is determined, the distance determiner 406 and/or the pedestrian zone adjustor 408 employs the comparator 410 to determine if the delta distance 216 is equal to or greater than the delta threshold 218.

If the electronic controller 150 determines that the delta distance 216 is equal to or greater than the delta threshold, the electronic controller 150 maintains the sensing area of the pedestrian zone 136 (block 818). For example, the electronic controller 150 maintains the sensing distance 138 of the pedestrian zone 136. If the electronic controller 150 determines that the delta distance 216 is less than the delta threshold, the electronic controller 150 adjusts the sensing area of the pedestrian zone 136 (block 820). For example, the electronic controller 150 continuously adjusts (e.g., increases or decreases) the sensing distance 138 of the pedestrian zone 136 to maintain the delta distance 216 between the vehicle 120 and the pedestrian zone 136 equal to or greater than the delta threshold 218. For example, to adjust (e.g., increase or decrease) the pedestrian zone 136, the pedestrian zone adjustor 408 may deactivate one or more of the pedestrian sensors 130a of the pedestrian scanner system 130, or the sensing projections 706a of the pedestrian scanner system 706.

Referring back to block 806, if the electronic controller 150 determines that the person 134 is present in the pedestrian zone 136, the electronic controller 150 determines if a vehicle is detected at the loading dock 100-700 (block 822). For example, the vehicle monitor 404 determines if the vehicle 120 is present at the loading dock 100, 500-700 based on the feedback signals provided by the vehicle sensor system 132, 504, 604, 704. If a vehicle is not detected at the loading dock (100, 500-700), the electronic controller 150 causes the outdoor signal device 140 to emit the third output signal 146 (e.g., a red light) (block 824). If a vehicle is detected at the loading dock (100, 500-700), the electronic controller 150 causes the outdoor signal device 140 to emit the fourth output 148 (e.g., a red light and audible alarm) (block 826).

The electronic controller 150 determines if the monitoring and alerting system 10 should persist (block 828). For example, the electronic controller 150 may determine to discontinue monitoring the monitoring and alert system 102, 502-702 based on user input, receiving continuing communication (e.g., a communication heartbeat signal, sensor information, etc.), etc. For example, the electronic controller 150 may continue to persist the monitoring and alert system 102, 502, 602, 702 until the electronic controller 150 determines that the vehicle 120 is parked at the doorway 104 of the dock face 112 or the electronic controller 150 (e.g., via the restraint monitor 414) determines that the vehicle 120 is secured to the dock face 112 via the vehicle restraint 124. If the electronic controller 150 determines at block 828 that alerting and monitoring are to continue (e.g., the monitoring and alert system 102, 502-702 should persist), control returns to block 802. If the electronic controller 150 determines that the monitoring and alert system 102, 502-702 should not continue (block 828), the program 800 ends.

Figure 9:
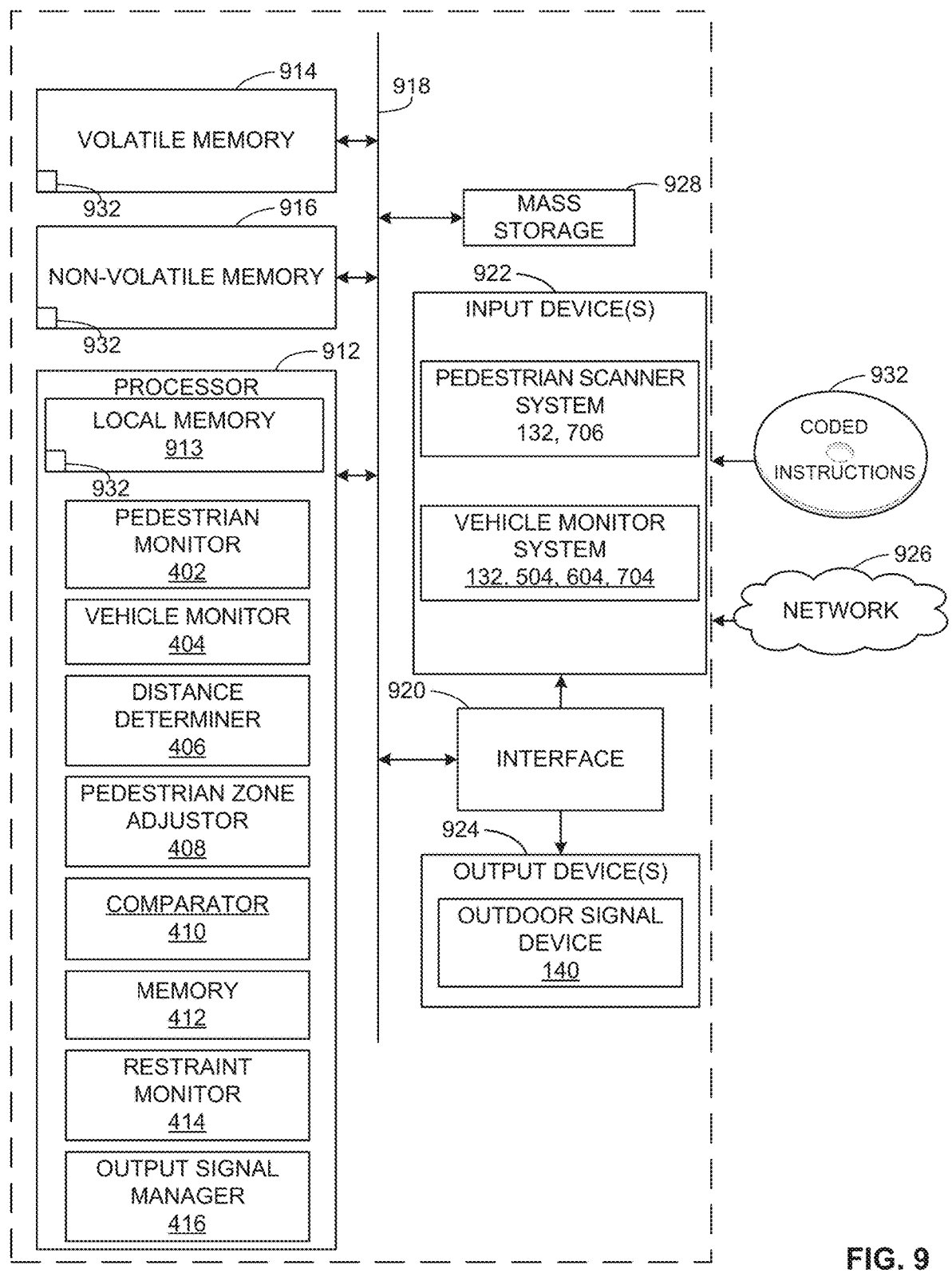
FIG. 9 is a block diagram of an example processor platform capable of executing the instructions of FIG. 8 to implement an example controller of FIG. 4.

FIG. 9 is a block diagram of an example processor platform 900 structured to execute the instructions of FIG. 8 to implement the electronic controller of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example pedestrian monitor 402, the vehicle monitor 404, the distance determiner 406, the pedestrian zone adjustor 408, the comparator 410, the restraint monitor 414, and the output signal manager 416.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD From the foregoing, it will be appreciated that example methods, apparatus, and articles of manufacture have been disclosed that enable dynamically changing or modifying a sensing area or size of a pedestrian zone when a vehicle is moving toward a dock face of a loading dock to improve safety systems at loading docks. In some examples, such modification of the sensing area of a pedestrian zone are based on a detected position of vehicle relative to the pedestrian zone and/or the dock face.

At least some of the aforementioned examples include one or more features and/or benefits including, but not limited to, the following:

In some examples, a monitoring and alert system includes a first sensor system to determine a position of a vehicle relative to a pedestrian zone adjacent a dock wall of a loading dock. A second sensor system is to monitor the pedestrian zone. The second sensor system is to attempt to detect a pedestrian in the pedestrian zone, the second sensor system responsive to signals from the first sensor system to enable the second sensor system to dynamically change a sensing area of the pedestrian zone to maintain a delta threshold between the vehicle and the pedestrian zone in response to the vehicle moving toward a dock wall of the loading dock.

In some examples, the first sensor system is to determine a distance of the vehicle relative to the dock wall, and the second sensor system is to change the sensing area of the pedestrian zone based on the distance of the vehicle relative to the dock wall to maintain the delta threshold between a leading edge of the pedestrian zone and the vehicle in response to the vehicle moving toward the dock wall.

In some examples, the second sensor system is to dynamically change the sensing area of the pedestrian zone by reducing a sensing distance of the pedestrian zone between a dock wall of the loading dock and a leading edge of the pedestrian zone.

In some examples, the second sensor system is to modify the sensing distance of the pedestrian zone from a first distance at which a leading edge of the pedestrian zone is at an initial position to a second distance at which the leading edge of the pedestrian zone is at an intermediate position relative the dock face, the second distance being less than the first distance.

In some examples, a signaling device responsive to signals of the first sensor system and the second sensor system, the signaling device to emit: a first alert in response to a vehicle not being present at the loading dock based on signals from the first sensor system and the pedestrian not being present in the pedestrian zone based on signals from the second sensor system; a second alert in response to the vehicle being present at the loading dock based on signals from the first sensor system and a pedestrian not being present in the pedestrian zone based on signals from the second sensor system, the first alert being different from the second alert; a third alert in response to the vehicle not being present at the loading dock based on signals from the first sensor system and a pedestrian being present in the pedestrian zone based on signals from the second sensor system, the third alert being different from the first alert and the second alert; or a fourth alert in response to the vehicle being present at the loading dock based on signals from the first sensor system and a pedestrian being present in the pedestrian zone based on signals from the second sensor system, the fourth alert being different from the first alert, the second alert and the third alert.

In some examples, a tangible computer-readable medium comprising instructions that, when executed, cause a machine to at least: detect a presence of a vehicle at a loading dock; detect a presence of a pedestrian in a pedestrian zone located adjacent a dock face of the loading dock; in response to detecting the vehicle, determine a position of the vehicle relative to a pedestrian zone of the loading dock; and in response to determining the position of the vehicle, dynamically reduce a sensing area of the pedestrian zone relative to the dock face based on the determined position of the vehicle to maintain a delta threshold between the pedestrian zone and the vehicle in response to the vehicle moving toward the loading dock.

In some examples, the instructions, when executed, cause the machine to determine a distance of the vehicle relative to the dock face.

In some examples, the instructions, when executed, cause the machine to change the sensing area of the pedestrian zone based on the distance of the vehicle relative to the dock face to maintain the delta threshold between a leading edge of the pedestrian zone and the vehicle in response to the vehicle moving toward the dock face.

In some examples, the instructions, when executed, cause the machine to modify a position of a leading edge of the pedestrian zone from an initial position at a first distance to an intermediate position at a second distance from the dock face to dynamically reduce the sensing area of the pedestrian zone, the second distance being less than the first distance.

In some examples, the instructions, when executed, cause the machine to determine the position of the vehicle relative to the pedestrian zone based on feedback signals from a first sensor system.

In some examples, the instructions, when executed, cause the machine to determine a presence of a pedestrian in the pedestrian zone based on feedback signals of a second sensor system.

In some examples, a system includes first means for sensing a vehicle at the loading dock; means for generating a pedestrian zone adjacent a dock face of the loading dock; means for determining a position of the vehicle relative to the pedestrian zone based on the first means for sensing; and means for dynamically modifying a sensing area of the pedestrian zone based on a determined position of the vehicle relative to the pedestrian zone, the means for dynamically modifying the sensing area is to maintain a delta threshold between the pedestrian zone and the vehicle in response to the vehicle moving toward the loading dock.

In some examples, the means for generating the pedestrian zone includes second means for sensing to detect a presence of a pedestrian in the pedestrian zone.

In some examples, means for controlling a signaling device based on outputs from the first means for sensing and the second means for sensing.

In some examples, the means for dynamically modifying the sensing area of the pedestrian zone includes means for adjusting a leading edge of the pedestrian zone toward the dock face to maintain the delta threshold between the leading edge and the vehicle.

In some examples, a method includes determining, via a logic circuit, a position of a vehicle relative to a dock face of a loading dock based on a first signal from a first sensor system; monitoring, via the logic circuit, for a presence of a pedestrian in a pedestrian zone located adjacent a dock face of a loading dock based on a second signal from a second sensor system; and dynamically modifying, via the logic circuit, a sensing area of a pedestrian zone adjacent the dock face in response to the determined position of the vehicle to maintain a delta threshold between the vehicle and the pedestrian zone in response to the vehicle moving toward the loading dock.

In some examples, the method includes detecting, via a logic circuit, a presence of the pedestrian in the pedestrian zone based on the second signal.

In some examples, the method includes dynamically modifying the sensing area of the pedestrian zone includes reducing a sensing distance of the pedestrian zone between dock wall and a leading edge of the pedestrian zone.

In some examples, the method includes emitting one or more alerts based on feedback signals from the first sensor system and the second sensor system.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A monitoring and alert system, the system comprising:
a first sensor system to determine a position of a vehicle relative to a pedestrian zone adjacent a dock wall of a loading dock; and
a second sensor system to monitor the pedestrian zone, the second sensor system to attempt to detect a pedestrian in the pedestrian zone, the second sensor system responsive to signals from the first sensor system to enable the second sensor system to dynamically change a sensing area of the pedestrian zone to maintain a delta threshold between the vehicle and the pedestrian zone in response to the vehicle moving toward a dock wall of the loading dock.

2. The system as defined in claim 1, wherein the first sensor system is to determine a distance of the vehicle relative to the dock wall, and the second sensor system is to change the sensing area of the pedestrian zone based on the distance of the vehicle relative to the dock wall to maintain the delta threshold between a leading edge of the pedestrian zone and the vehicle in response to the vehicle moving toward the dock wall.

3. The system as defined in claim 1, wherein the second sensor system is to dynamically change the sensing area of the pedestrian zone by reducing a sensing distance of the pedestrian zone between a dock wall of the loading dock and a leading edge of the pedestrian zone.

4. The system as defined in claim 3, wherein the second sensor system is to modify the sensing distance of the pedestrian zone from a first distance at which a leading edge of the pedestrian zone is at an initial position to a second distance at which the leading edge of the pedestrian zone is at an intermediate position relative the dock face, the second distance being less than the first distance.

5. The system as defined in claim 1, further including a signaling device responsive to signals of the first sensor system and the second sensor system, the signaling device to emit:
a first alert in response to a vehicle not being present at the loading dock based on signals from the first sensor system and the pedestrian not being present in the pedestrian zone based on signals from the second sensor system;
a second alert in response to the vehicle being present at the loading dock based on signals from the first sensor system and a pedestrian not being present in the pedestrian zone based on signals from the second sensor system, the first alert being different from the second alert;
a third alert in response to the vehicle not being present at the loading dock based on signals from the first sensor system and a pedestrian being present in the pedestrian zone based on signals from the second sensor system, the third alert being different from the first alert and the second alert; or
a fourth alert in response to the vehicle being present at the loading dock based on signals from the first sensor system and a pedestrian being present in the pedestrian zone based on signals from the second sensor system, the fourth alert being different from the first alert, the second alert and the third alert.

6. The system as defined in claim 1, wherein the first sensor system includes a first sensor positioned adjacent a first lateral edge of a doorway of the loading dock and a second sensor positioned adjacent a second lateral edge of the doorway opposite the first lateral edge.

7. The system as defined in claim 1, wherein the first sensor system includes a sensor to emit a plurality of sensing planes at different angles relative to the dock wall.

8. The system as defined in claim 1, wherein the first sensor system includes a plurality of sensors along a driveway of the loading dock, each sensor of the plurality of sensors being positioned at a different distance from the dock wall of the loading dock.

9. The system as defined in claim 1, wherein to dynamically change the sensing area, the second sensor is to dynamically reduce the sensing area of the pedestrian zone to maintain the delta threshold between the vehicle and the pedestrian zone in response to the vehicle moving toward the dock wall of the loading dock, and wherein the delta threshold is a predetermined delta threshold.

10. The system as defined in claim 9, wherein the predetermined delta threshold distance is a uniform distance between a leading edge of the pedestrian zone and a rear edge of the vehicle as the vehicle moves from an outer most edge of the pedestrian zone to the doorway of the loading dock.

11. The system as defined in claim 1, wherein to dynamically change the sensing area, the second sensor system is to continuously reduce the sensing area of the pedestrian zone to maintain the delta threshold in response to the vehicle moving toward a dock wall of the loading dock.

12. A non-transitory computer-readable medium instructions that, when executed, cause a machine to at least:
detect a presence of a vehicle at a loading dock relative to a pedestrian zone located adjacent a dock face of the loading dock based on first feedback signals from a first sensor system;
detect a presence of a pedestrian in the pedestrian zone via second feedback signals received from a second sensor system different from the first sensor system;
in response to detecting the vehicle, determine a position of the vehicle relative to the pedestrian zone via the first feedback signals of the loading dock; and
dynamically reduce a sensing area of the pedestrian zone relative to the dock face based on the determined position of the vehicle to maintain a predetermined delta threshold between the pedestrian zone and the vehicle in response to the vehicle moving toward the loading dock.

13. The non-transitory computer-readable medium as defined in claim 12, wherein the instructions, when executed, cause the machine to determine a distance of the vehicle relative to the dock face.

14. The non-transitory computer-readable medium as defined in claim 13, wherein the instructions, when executed, cause the machine to reduce change the sensing area of the pedestrian zone based on the determined distance of the vehicle relative to the dock face to maintain the predetermined delta threshold between a leading edge of the pedestrian zone and the vehicle in response to the vehicle moving toward the dock face.

15. The non-transitory computer-readable medium as defined in claim 12, wherein the instructions, when executed, cause the machine to modify a position of a leading edge of the pedestrian zone from an initial position at a first distance to an intermediate position at a second distance from the dock face to dynamically reduce the sensing area of the pedestrian zone, the second distance being less than the first distance.

16. The non-transitory computer-readable medium as defined in claim 12, wherein the instructions, when executed, cause the machine to command a signaling device based on the feedback signals from the first sensor system and the second sensor system.

17. A method comprising:
determining, via a logic circuit, a position of a vehicle relative to a dock face of a loading dock based on a first signal from a first sensor system;
monitoring, via the logic circuit, for a presence of a pedestrian in a pedestrian zone located adjacent a dock face of a loading dock based on a second signal from a second sensor system; and
dynamically reducing, via the logic circuit, a sensing area of a pedestrian zone adjacent the dock face in response to the determined position of the vehicle based on the first signal of the first sensor system to maintain a predetermined delta threshold between the vehicle and the pedestrian zone in response to the vehicle moving toward the loading dock.

18. The method as defined in claim 17, further including detecting, via a logic circuit, a presence of the pedestrian in the pedestrian zone based on the second signal.

19. The method as defined in claim 17, wherein dynamically reducing the sensing area of the pedestrian zone includes reducing a sensing distance of the pedestrian zone between dock wall and a leading edge of the pedestrian zone.

20. The method as defined in claim 17, further including emitting one or more alerts based on feedback signals from the first sensor system and the second sensor system.

21. The system as defined in claim 1, wherein the second sensor system is to reduce the sensing area as the vehicle moves toward the dock face to attempt to detect a pedestrian in the pedestrian zone until the vehicle is at least one of adjacent a doorway of the dock face or engaged by a vehicle restraint.

22. The system as defined in claim 1, wherein the monitoring and alert system further includes a controller communicatively coupled to the first sensor system and the second sensor system, the controller to receive one or more signals from a first sensor of the first sensor system and a second sensor of the second sensor system.

23. The system as defined in claim 22, wherein the controller is to cause the second sensor system to dynamically change the sensing area of the pedestrian zone to maintain the delta threshold between the vehicle and the pedestrian zone.

24. The system as defined in claim 1, wherein the first sensor system includes a first sensor to sense a presence of the vehicle.

25. The system as defined in claim 6, wherein the first sensor system is to detect a presence of a vehicle in response to a first sensing projection of the first sensor and a second sensing projection of the second sensor being interrupted contemporaneously.

26. The system as defined in claim 8, wherein the sensors are magnetic sensors.

* * * * *